United States Patent
Victoriano et al.

(10) Patent No.: US 11,714,394 B2
(45) Date of Patent: Aug. 1, 2023

(54) BULK COMMISSIONING OF FIELD DEVICES WITHIN A PROCESS PLANT

(71) Applicant: FISHER-ROSEMOUNT SYSTEMS, INC, Round Rock, TX (US)

(72) Inventors: Lourdes Angeli Punzalan Victoriano, Madaluyong (PH); Joseph Aballe Bacus, Mandaluyong (PH); James Kramer, Bloomington, MN (US); Scott N. Hokeness, Lakeville, MN (US)

(73) Assignee: FISHER-ROSEMOUNT SYSTEMS, INC, Round Rock, TX (US)

( * ) Notice: Subject to any disclaimer, the term of this patent is extended or adjusted under 35 U.S.C. 154(b) by 980 days.

(21) Appl. No.: 16/582,643

(22) Filed: Sep. 25, 2019

(65) Prior Publication Data
US 2020/0103844 A1    Apr. 2, 2020

Related U.S. Application Data

(60) Provisional application No. 62/738,713, filed on Sep. 28, 2018.

(51) Int. Cl.
*G05B 19/10* (2006.01)
*G06F 16/9035* (2019.01)
(Continued)

(52) U.S. Cl.
CPC ....... *G05B 19/106* (2013.01); *G05B 19/0428* (2013.01); *G06F 16/9035* (2019.01);
(Continued)

(58) Field of Classification Search
CPC ........... G05B 2219/13067; G05B 2219/25101; G05B 19/106; G05B 19/0428; G06F 16/9035; G06F 8/65
See application file for complete search history.

(56) References Cited

U.S. PATENT DOCUMENTS

| 5,796,602 A | 8/1998 | Wellan et al. |
| 6,098,116 A | 8/2000 | Nixon et al. |

(Continued)

FOREIGN PATENT DOCUMENTS

| CA | 3034647 A1 * | 3/2018 | ........... G06F 21/577 |
| CN | 101739007 A * | 6/2010 | ............... G06F 8/65 |

(Continued)

OTHER PUBLICATIONS

Eduard Van Niekerk, "Streamline Device Commissioning with Emerson AMS v13", published May 7, 2015 to https://www.linkedin.com/pulse/streamline-device-commissioning-eduard-van-niekerk, retrieved Nov. 16, 2022 (Year: 2015).*

(Continued)

*Primary Examiner* — Shourjo Dasgupta
(74) *Attorney, Agent, or Firm* — Marshall, Gerstein & Borun LLP

(57) ABSTRACT

A computer-implemented system and method for configuring a plurality of field devices enables a user to perform both device parameter editing and marking device parameters for bulk transfer in a simple an easy manner. The system and method provide a single application or utility that enables a user to view and make configuration changes as well as to view and change bulk transfer status for individual field device parameters while providing the user contextual information regarding the field device components to which the field device parameters belong or relate. The system and method provide the user with typical or standard configuration screens that enable the user to perform configuration activities in a simple and well-known format, but that include contextual indications of the various field device components to which the displayed field device parameters relate. This functionality enables the user to view and (Continued)

change the bulk transfer status of the individual parameters, without needing to go to a separate application or screen.

36 Claims, 16 Drawing Sheets

(51) Int. Cl.
  *G06F 8/65* (2018.01)
  *G05B 19/042* (2006.01)
(52) U.S. Cl.
  CPC .............. *G05B 2219/13067* (2013.01); *G05B 2219/25101* (2013.01)

(56) References Cited

U.S. PATENT DOCUMENTS

| | | | |
|---|---|---|---|
| 6,505,143 B1 | 1/2003 | Lakshminarasimha et al. | |
| 6,618,630 B1 | 9/2003 | Jundt et al. | |
| 6,957,206 B2 | 10/2005 | Nolan | |
| 7,496,634 B1 | 2/2009 | Cooley | |
| 7,761,591 B2 | 7/2010 | Graham | |
| 7,933,594 B2 | 4/2011 | Nixon et al. | |
| 8,248,958 B1* | 8/2012 | Tulasi ................ | H04L 43/50 370/241 |
| 8,527,888 B2 | 9/2013 | Bump et al. | |
| 9,052,708 B2 | 6/2015 | Vishwanath et al. | |
| 9,563,188 B2 | 2/2017 | Banerjee et al. | |
| 9,767,197 B1 | 9/2017 | Agarwal et al. | |
| 9,851,707 B2 | 12/2017 | Hokeness et al. | |
| 10,025,471 B1* | 7/2018 | Teicher ............... | G06F 3/0484 |
| 10,459,418 B2 | 10/2019 | Peluso et al. | |
| 2002/0087308 A1* | 7/2002 | Ozawa ................ | G10L 19/083 704/E19.024 |
| 2002/0104586 A1* | 8/2002 | Morikawa ............ | H01F 1/147 148/306 |
| 2002/0169977 A1 | 11/2002 | Chmaytelli | |
| 2003/0014536 A1 | 1/2003 | Christensen et al. | |
| 2003/0051056 A1 | 3/2003 | Pascual et al. | |
| 2003/0097426 A1* | 5/2003 | Parry .................. | H04L 67/10 709/229 |
| 2004/0162829 A1 | 8/2004 | Gabos et al. | |
| 2004/0259533 A1 | 12/2004 | Nixon et al. | |
| 2005/0123884 A1 | 6/2005 | Walls et al. | |
| 2005/0217797 A1 | 10/2005 | Jafarian-Tehrani | |
| 2006/0087402 A1* | 4/2006 | Manning .......... | G05B 19/41875 340/3.1 |
| 2006/0092039 A1 | 5/2006 | Saito et al. | |
| 2007/0078540 A1 | 4/2007 | Bump et al. | |
| 2007/0150574 A1 | 6/2007 | Mallal et al. | |
| 2008/0034015 A1 | 2/2008 | Behnen et al. | |
| 2008/0288321 A1* | 11/2008 | Dillon ................ | G05B 23/0283 705/7.13 |
| 2009/0070051 A1 | 3/2009 | Vetter et al. | |
| 2009/0082894 A1* | 3/2009 | Pettus ................. | G05B 19/418 700/105 |
| 2009/0125825 A1 | 5/2009 | Rye et al. | |
| 2009/0210386 A1 | 8/2009 | Cahill | |
| 2009/0292995 A1* | 11/2009 | Anne ................. | G05B 19/0426 715/764 |
| 2010/0149997 A1 | 6/2010 | Law et al. | |
| 2010/0290351 A1 | 11/2010 | Toepke et al. | |
| 2011/0191500 A1 | 8/2011 | Odayappan et al. | |
| 2011/0234469 A1 | 9/2011 | Shoji | |
| 2011/0238190 A1* | 9/2011 | Okamoto ........... | G05B 19/0426 700/86 |
| 2011/0265151 A1 | 10/2011 | Furlan et al. | |
| 2011/0313547 A1 | 12/2011 | Hernandez et al. | |
| 2012/0078386 A1 | 3/2012 | Holmes et al. | |
| 2012/0078869 A1 | 3/2012 | Bellville et al. | |
| 2012/0093242 A1 | 4/2012 | Wallace et al. | |
| 2012/0235479 A1* | 9/2012 | Seiler ................. | G05B 19/042 307/11 |
| 2012/0310381 A1* | 12/2012 | Karaffa ............... | G05B 19/418 700/80 |
| 2013/0031260 A1 | 1/2013 | Jones | |
| 2013/0211547 A1 | 8/2013 | Buchdunger et al. | |
| 2013/0282931 A1 | 10/2013 | Petzen et al. | |
| 2014/0025186 A1 | 1/2014 | Ojha et al. | |
| 2014/0067091 A1 | 3/2014 | Vishwanath et al. | |
| 2014/0212978 A1 | 7/2014 | Sharpe, Jr. et al. | |
| 2014/0313543 A1* | 10/2014 | Ono ..................... | G06F 3/1225 358/1.15 |
| 2015/0032273 A1 | 1/2015 | Romney et al. | |
| 2015/0039130 A1 | 2/2015 | Banerjee et al. | |
| 2015/0066162 A1 | 3/2015 | Hokeness et al. | |
| 2015/0127876 A1 | 5/2015 | Erni et al. | |
| 2015/0135117 A1 | 5/2015 | Rajappa et al. | |
| 2015/0233790 A1 | 8/2015 | Ratilla et al. | |
| 2016/0078163 A1* | 3/2016 | Koshimaki .......... | G05B 19/042 716/139 |
| 2016/0132048 A1 | 5/2016 | Kambe et al. | |
| 2016/0216706 A1 | 7/2016 | Christensen et al. | |
| 2016/0259315 A1 | 9/2016 | Alexander et al. | |
| 2017/0153880 A1* | 6/2017 | Chen .................... | G06F 8/60 |
| 2017/0227944 A1 | 8/2017 | Goli et al. | |
| 2018/0109955 A1* | 4/2018 | Nixon ................. | H04L 67/10 |
| 2018/0262497 A1* | 9/2018 | Raje .................. | G06F 9/44542 |
| 2020/0034443 A1* | 1/2020 | Kentley ............... | G06F 16/284 |

FOREIGN PATENT DOCUMENTS

| | | | | |
|---|---|---|---|---|
| CN | 105453655 A | * | 3/2016 | ........... H04J 11/003 |
| CN | 107132809 A | * | 9/2017 | .......... G05B 19/056 |
| CN | 103200021 B | * | 2/2018 | |
| CN | 104977874 B | * | 4/2018 | .......... G05B 19/418 |
| CN | 108121548 A | * | 6/2018 | |
| GB | 2 484 008 A | | 3/2012 | |
| JP | 2002-258936 A | | 9/2002 | |
| JP | 2003-186529 A | | 7/2003 | |
| JP | 2004078392 A | * | 3/2004 | ............ H04L 12/24 |
| JP | 2004198520 A | * | 7/2004 | |
| JP | 2005018134 A | * | 1/2005 | |
| JP | 2005136470 A | * | 5/2005 | |
| JP | 2005-531826 A | | 10/2005 | |
| JP | 3800153 B2 | * | 7/2006 | ............ H04H 60/04 |
| JP | 2006-302229 A | | 11/2006 | |
| JP | 2007213233 A | * | 8/2007 | |
| JP | 2008-192152 A | | 8/2008 | |
| JP | 2009-505232 A | | 2/2009 | |
| JP | 2009-518749 A | | 5/2009 | |
| JP | 2011-059873 A | | 3/2011 | |
| JP | 2011-203954 A | | 10/2011 | |
| JP | 2012-032899 A | | 2/2012 | |
| JP | 2014-096099 A | | 5/2014 | |
| JP | 2014179050 A | * | 9/2014 | ............... G06F 8/65 |
| WO | WO-2009006853 A1 | * | 1/2009 | ............ H04L 12/24 |
| WO | WO-2010134723 A2 | * | 11/2010 | ............... G10H 1/34 |
| WO | WO-2017/066304 A1 | | 4/2017 | |

OTHER PUBLICATIONS

Cumulocity IoT Guides, "Device Control", published Sep. 6, 2011 to https://cumulocity.com/guides/10.4.6/reference/device-control/#overview, retrieved Nov. 16, 2022 (Year: 2011).*

Cumulocity IoT Guides, "Device Integration using MQTT", published Nov. 30, 2016 to https://cumulocity.com/guides/device-sdk/mqtt, retrieved Nov. 16, 2022 (Year: 2016).*

"AMS Device Manager Overview and Update", published Mar. 21, 2018 to https://emersonexchange365.com/events/nashville-2019/m/presentations/5875/download, retrieved Nov. 16, 2022 (Year: 2018).*

"Migration Manager for AD 8.14—User Guide", published on Jul. 4, 2017 to https://support.quest.com/technical-documents/migration-manager-for-ad/8.14/user-guide/4, retrieved Nov. 21, 2022 (Year: 2017).*

Examination Report for Application No. GB1914022.7, dated Mar. 1, 2022.

475 Field Communicator Product Data Sheet, Emerson Process Management, May 2013, available at: <www.fieldcommunicator.com> 8 pages.

(56) References Cited

OTHER PUBLICATIONS

AMS Suite—Improve Reliability and Performance, Emerson Process Management, 2013, available at: <www.assetweb.com>, 16 pages.
Chen, Deji, Mark Nixon, and Aloysius Mok. "Why WirelessHART." WirelessHARTTM. Springer US, 2010. pp. 195-199.
Decision on Rejection for Japanese Patent Application No. 2016-540377, dated Oct. 31, 2017, 9 pages including English translation.
EPO Communication for European Patent Application No. 14841731.4, dated Mar. 16, 2017, 12 pages.
Fan, Jiyuan, and Stuart Borlase. "The evolution of distribution." IEEE Power and Energy magazine 7.2 (2009): pp. 63-68.
First Office Action for Chinese Patent Application No. 201480003931.5 dated Nov. 9, 2016, 27 pages.
International Search Report and Written Opinion for International Application No. PCT/US2014/054055, dated Dec. 17, 2014, Date of Filing: Sep. 4, 2014, 15 pages.
Office Action for Japanese Patent Application No. 2016-540377, dated Mar. 7, 2017, 7 pages with English translation.
Search Report for Application No. GB1815499.7, dated Mar. 11, 2019.
Second Office Action for Chinese Patent Application No. 201480003931.5. dated Jul. 6, 2017, 27 pages including English translation.
Wollschlaeger, Martin, et al. "Integration of fieldbus systems into on-line asset management solutions based on fieldbus profile descriptions." Factory Communication Systems, 2002. 4th IEEE International Workshop on. IEEE, 2002. pp. 89-96.
Search Report for Application No. GB1914022.7, dated Mar. 25, 2020.

\* cited by examiner

FIG. 5

644 rev 9 [644 Temperature Transmitter Rev9]

▼ Configure for Bulker

▼ HART Block

| Layout | Other Parameters | Parameters to Send (6) | |
|---|---|---|---|
| 404A | 404B | 404C | |
| ▼ Parameter | Value | | ▼ IsMarkedToSend |
| Second Variable | Sensor 1 Temperature ▶ | | ⇥ |
| Trigger Level | Fixed - 5K Ohms ▶ | | ⇥ |
| Snsr 1 Cal Mode | User Trim ▶ | | ⇥ |
| Sensor Type | T/C type K ▶ | | ⇥ |
| Connection | 2 Wire ▶ | | ⇥ |
| Sensor Type | T/C type K ▶ | | ⇥ |

450
452
456
458
460
451
402
420 Save
422 Cancel

FIG. 12

644 rev 9 [644 Temperature Transmitter Rev9]

▼ Configure for Bulk Transfer

▲ HART Block

| Layout | Other Parameters | Parameters to Send (8) |
| --- | --- | --- |
| ▼ Parameter | ▼ Value | ▼ IsMarkedToSend |
| Parameter 1 | | ☐ |
| Parameter 2 | value 1 | ☑ |
| Parameter 3 | Some Value 2222 | ☑ |
| Parameter 4 | | ☐ |

← 472

Loading Data...

Data Retrieval

*644rev9 - AMS Device Manager — □ ×*

🖶 Print ⓘ Help      PHSD561\Administrator

▲ Configure for Bulk Transfer    [Save] [Cancel]

Guided Setup
   Manual Setup

← 480

| Layout | Other Parameters | For Transfer |

| Transfer Status | Parameter | Value |
|---|---|---|
| ⊘ | Loop current mode | Disabled ▾ |
| ⊘ | Burst Msg Trigger Mode | Continuous ▾ |
| ⊘ | Event Notification Control | Off ▾ |
| ⊘ | Device Status Mask | ☐ Primary variable out of limits<br>☐ Non-primary variable out of limits<br>☒ PV Analog Channel Saturated<br>☐ PV Analog Channel Fixed<br>☐ More status available<br>☐ Cold start<br>☐ Configuration changed<br>☐ Field device malfunction |
| ⊘ | Ext dev status Mask | ☐ Maintenance required<br>☐ Device variable alert<br>☐ Critical Power Failure |

↖ 482    ↙ 484    ↖ 486

[Save] 420   [Cancel] 422

FIG. 15

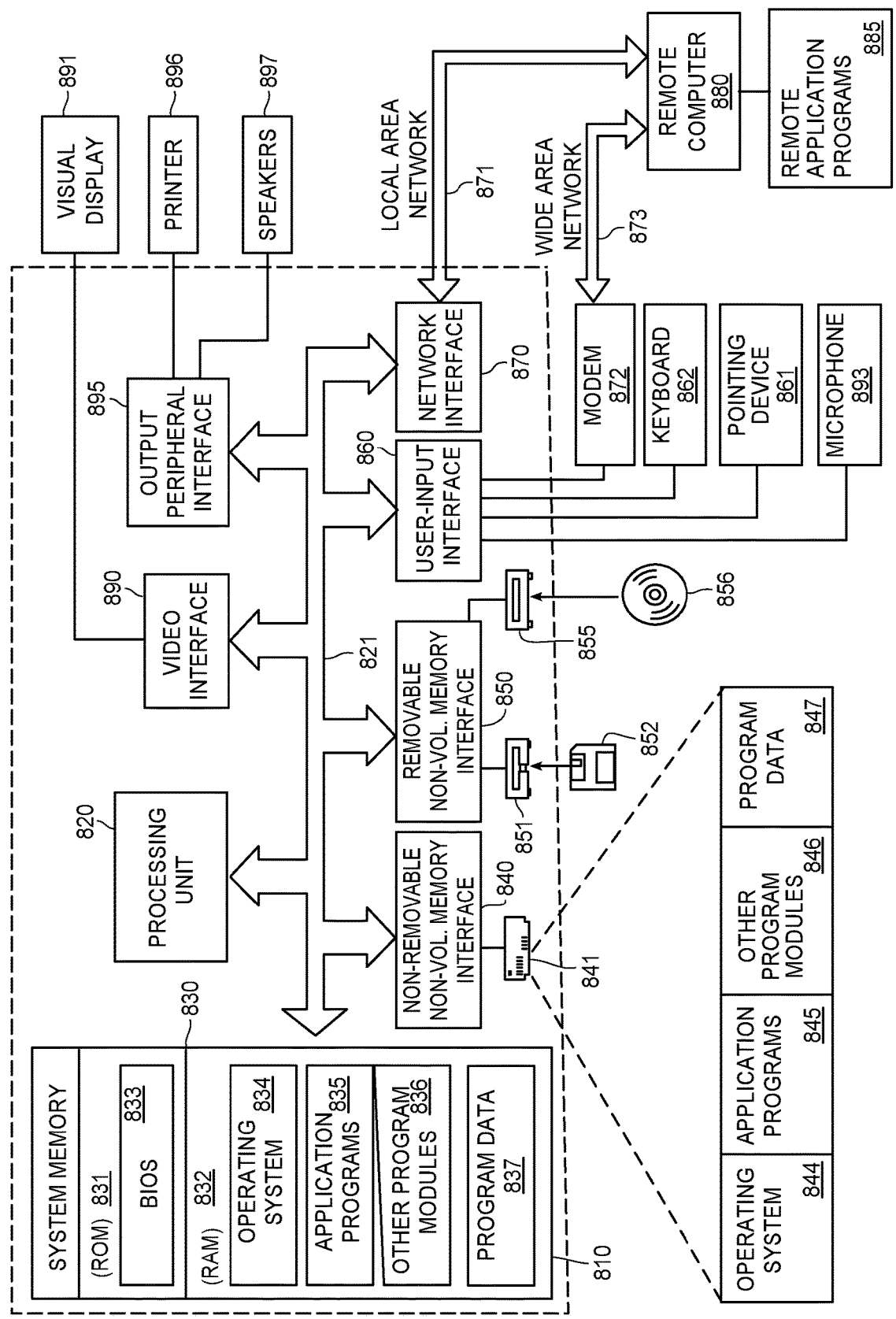

BULK COMMISSIONING OF FIELD DEVICES WITHIN A PROCESS PLANT

CROSS REFERENCE TO RELATED APPLICATIONS

This application claims the priority of and benefit of U.S. Provisional Patent Application No. 62/738,713, filed Sep. 28, 2018, the entire contents of which are hereby expressly incorporated by reference herein. This application is also related to U.S. patent application Ser. No. 15/722,383, entitled "TECHNOLOGY FOR ASSESSING AND PRESENTING FIELD DEVICE COMMISSIONING INFORMATION ASSOCIATED WITH A PROCESS PLANT" filed on Oct. 2, 2017, which is a continuation-in-part of U.S. patent application Ser. No. 14/477,266, entitled "BULK FIELD DEVICE OPERATIONS," filed on Sep. 4, 2014 and which issued as U.S. Pat. No. 9,851,707 on Dec. 26, 2017, and claims the benefit of U.S. Provisional Application No. 61/873,390, entitled "FIELD DEVICE INTERACTIONS" filed on Sep. 4, 2013, the entire contents of each of which are hereby incorporated by reference herein.

TECHNICAL FIELD

This patent relates generally to process plants and process control systems, and more particularly, to bulk commissioning of process control devices within a process plant.

BACKGROUND

Field devices, such as process variable transmitters, etc., are used in the process control industry to remotely sense and/or control a process variable. Field devices, such as process actuators, are used by the process control industry to remotely control physical parameters of a process, such as flow rate, temperature, pressure, etc. The process variable may be transmitted to a control room or other controller in the field, for example, from a field device to provide information about the process to a controller. The controller may then transmit control information to another field device, such as an actuator, to modify a controlled parameter of the process. For example, information related to a pressure of a process fluid may be transmitted to a control room or to a controller in a plant and be used to control a process such as oil refining.

Intelligent field devices are field devices that include processing circuitry and communicate digitally on a process communication loop or segment. Examples of such digital process communication include process communication protocols such as the Highway Addressable Remote Transducer (HART®) protocol, the FOUNDATION™ Fieldbus protocol, Profibus, WirelessHART® (such as that in accordance with IEC62591), etc. Additional examples of digital communications include communication on a MUX network, a Wireless Gateway network, a modem network, or any other suitable digital communication network. Intelligent field devices are more complex than the analog field devices which they often replace. Moreover, intelligent field devices are able to provide additional information and control functions in comparison to analog, 4-20 mA, field devices.

Before intelligent field devices can be used on a process communication loop or segment, these field devices must be configured properly in order to effectively communicate valid process data and other device data to control systems, programmable logic controllers, and/or remote terminal units. Field devices can also provide valuable diagnostic information about their own health as well as the process health. To take advantage of this functionality and to avoid false alarms, it is important to configure the diagnostic functions, alert levels, and other configurable parameters of each field device properly. However, configuring intelligent field devices can be a time-consuming and error-prone process. Considering that, in some large processing plants, hundreds if not thousands of intelligent field devices may be used to control, monitor, and maintain production processes within safe limits, the efforts required for such configuration are not trivial. Moreover, each intelligent field device may have multiple different components, e.g., sensors, transducer blocks, programmable objects, calculated outputs, display features, etc. and each of these various components may have many different parameters that can be configured.

Historically, intelligent field devices have been configured individually using handheld communicators, such as that sold under the trade designation Model 475 Field Communicator available from Emerson Process Management of Austin, Tex. Alternatively, intelligent field devices have also been configured individually using configuration software such as that sold under the trade designation AMS Device Manager available from Emerson Process Management.

To make the configuration tasks in a process plant easier, especially in a large plant having hundreds or even thousands of intelligent field devices, U.S. Pat. No. 9,851,707 describes a configuration system that enables configuration of process control field devices using a bulk edit and download (commissioning) feature. Generally speaking, this configuration system includes a configuration application or configuration utility that stores one or more configuration templates and that enables the user to map the configuration template(s) to a plurality of field devices within the plant. In one case, the commissioning templates may include or be linked to fields in a spreadsheet that define the commissioning parameters for each of a number of field devices, and the data within the spreadsheet, when completed, may be downloaded to or provided to the field devices in a bulk download or commissioning operation. This system allows the user to fill out information in the configuration template for multiple different field devices separately, and to then apply the configuration data to the plurality of field devices in a bulk download or commissioning process. This system thus makes the commissioning of the process plant field devices easier because the configuration engineer performing the commissioning no longer has to download the commissioning information of each field device separately or via a handheld device, but can, instead, perform downloads or configuration changes in a bulk manner.

As implemented, the bulk edit and download configuration system is provided as a separate application or utility within an application from the configuration application or configuration utility. Thus, the configuration utility includes a general configuration application that provides a user interface that enables a user to configure each different field device separately. In this case, the user may drill down (e.g., within a device or plant hierarchy) to a particular field device within the process plant configuration system, and may view and change the parameters of the field device configuration as stored in the configuration database. Generally speaking, this configuration application displays the parameters of the field device in some sort of list as obtained from the configuration database. More particularly, some of the field device parameters are grouped together in a layout view (which is common and known to configuration engineers) while some parameters are presented by themselves. The user can make changes to the parameter values and can store those changes in the configuration database. However, if the user wants a particular parameter or new value of the parameter to be sent during a bulk transfer process, the user needs to pull up a separate bulk transfer configuration application or utility (which also has access to the configuration database), locate the particular field device parameter by finding the correct field device and scrolling through all of the device parameters in a separate view. The user must then mark the parameter to set this parameter change to be applied during a bulk transfer operation. However, this bulk transfer configuration application or utility simply lists each of the field device parameters of a particular field device separately by name in a list view, but does not provide any context about the field device parameters, such as which component of the field device to which each of the field device parameters belong. In many instances, there may be multiple field device parameters of the same name (e.g., one for each of a number of similar field device components, such as sensors), and so it becomes difficult for the user to determine which field device parameter needs to be downloaded as part of the bulk transfer operation. Moreover, as the number of device parameters for a field device may be large, e.g., 100 or more, it can be very difficult for the user to locate a particular device parameter of interest in the bulk transfer application. Moreover, if the user wants to configure certain device parameters using the traditional configuration application to be part of a bulk download, the user must first configure the parameter in the configuration application, and then pull up a separate screen display used to mark current device parameters to be configured for bulk edit or transfer and then change the parameter to be part of the bulk transfer. Unfortunately, as noted above, this second bulk edit and transfer screen presents the parameters in a different manner (e.g., using different user interface screens and views) than provided by the configuration screens in the configuration application, which makes it harder for the user to find the device parameter of interest in the bulk transfer application or utility, or to determine if the device parameter of interest is, in fact, configured for bulk transfer.

As an example, a current configuration system that enables bulk edit and transfer of field device parameters provides two separate configuration views of or for a field device, including a layout view and a bulk transfer view. Generally speaking, the layout view provides a fixed or standard interface identifying the primary field device parameters and values for these parameters which can be altered to change the field device configuration parameter values. Generally, this layout view is structured according to the manner in which field device parameters are provided in the field device DD (device description) provided by the field device manufacturer and so the layout view may provide some context as to how some of the field device parameters relate to the various components of the field device, such as which field device parameters are related to which sensors of the field device. However, there may be many other field device parameters for the field device which are then provided in a list view at the bottom of the layout view, which the user must scroll through in the configuration interface to view. When there are many field device parameters, it may be difficult for the user to find a particular field device parameter for editing.

Still further, after the user changes a field device parameter in the layout view, the user must mark the parameters as being edited. Then, in order to configure those parameter changes for bulk transfer, the user must pull up the bulk transfer application, find the field device of interest, scroll to the edited parameters of the field device and mark these changes for bulk transfer. This bulk transfer configuration process makes the process of configuring field device parameter changes for bulk edit and transfer tedious, time consuming, and prone to error. More particularly, the bulk transfer display screens display all of the field device in a list inside a tab view, which is very different from the layout view, which the user uses for configuration operation. Moreover, some of the parameters are grouped while some are displayed by themselves, and because there are usually more than 100 parameters for a device listed vertically in a single column, it can be very difficult for the user to locate the exact parameter he or she wants to configure and send during bulk transfer. This difficulty may be exacerbated when there are multiple different field device parameters of the same name within the field device.

SUMMARY

A computer-implemented system and method for configuring a plurality of field devices enables a user to perform both device parameter editing and marking device parameters for bulk transfer in a simple an easy manner. In particular, the system and method provide a single application or utility that enables a user to view and make configuration changes as well as to view and change bulk transfer status for individual field device parameters while providing the user some contextual information regarding the field device components to which these parameters belong or relate. The system and method may provide the user with typical or standard configuration screens that enable the user to perform configuration activities in a simple and well-known format, but that include contextual indications of the various field device components to which the displayed field device parameters relate. This functionality also enables the user to view and change the bulk transfer status of the individual parameters, without needing to go to a separate application or screen. Thus, the system and method described herein enable the user to perform configuration activities for field device parameters, and to set these configuration changes for bulk transfer, within a system that provides contextual information about the field device component to which the field device parameters relate, thereby making it easier for the user to perform configuration activities for bulk transfer correctly. Moreover, the system and method described herein provides a simple and easy to understand methodology of finding various parameters in the configuration screens of the configuration utility in a manner that reduces download and communication times, to make configuration activities easier and quicker.

In one case, a configuration system for use in configuring field devices in a process plant includes a database that stores configuration information for a plurality of field devices in the plant, a configuration application and a bulk transfer application. The configuration information includes, for each of the plurality of field devices, a set of configurable field device parameters for each of the plurality of field devices and an indication of a set of field device components for each field device. Moreover, the configuration application executes on a processor to access the database and to provide, to a user via a display device, configuration information pertaining to a selected one of the plurality of field devices, the configuration information including, for a field device, a plurality of field device components associated with the field device and a set of field device parameters associated with the field device including, for each field device parameter, a field device parameter name, an editable field device parameter value field, and a bulk transfer status indication associated with the field device parameter. Moreover, the configuration application enables the user to select one of the field device components via the user interface and creates a display that displays information identifying a plurality of field device parameters related to the selected one of the field device components to which the field device parameters are associated. Additionally, the configuration application enables the user to alter the field device parameter value in a field device parameter value field and to view the bulk transfer status indication of the edited field device parameter at the same time. Still further, the bulk transfer application downloads the parameter values within the parameter value fields of each of the field device parameters having a bulk transfer status set for participation in the bulk transfer to the field device.

The configuration application may automatically set the bulk transfer status indication of a particular field device parameter to indicate that the particular field device parameter is set for a bulk transfer operation when the user changes the field device parameter value in the field device parameter value field of the particular field device parameter. Likewise, the configuration application may enable the user to interact with the field device bulk transfer status indication for a particular field device parameter to change the bulk transfer status of the particular field device parameter.

In one case, the configuration application displays a first screen that includes indications of multiple ones of the field device components and enables a user to select one of the indications of the field device components and, in response to the selection of one of the indications of the field device components, displays a plurality of field device parameters related to the selected field device components. Here, the configuration application, in response to the selection of the one of the indications of the field device components, may display a set of field device parameters related to the selected field device component without displaying any field device parameters not related to the selected field device component. The configuration application may display indications of multiple ones of the field device components and present a different set of field device parameters to the user via the display in response to a selection of each of the different ones of the field device components.

In another case, the configuration application displays a first set of screens, with each screen including field device parameters associated with different ones of the field device components, and a second screen that includes parameters not associated with any of the field device components. The configuration application may display in the first set of screens, field device parameters associated with different ones of the field device components as defined by a device description for the field device. Additionally, the configuration application may display a first set of screens, with each screen in the first set of screens including field device parameters related to different ones of the field device components, and a second screen that includes all other field device parameters for the field device not displayed in any of the first set of screens.

If desired, the configuration application displays a selectable set of views to be used to display field device parameters for the field device and enables the user to switch between the views. The selectable set of views to be used to display field device parameters may include a first view that displays field device parameters as defined by a device description for the field device and a second view that displays all other field device parameters not included in the first view. The selectable set of views may also include a third view that indicates all of the field device parameters that are currently set to participate in a bulk transfer operation.

In any case, the field device components may include physical components, such as sensors, or logical components, such as display components, diagnostic components, function block components, and output components, or any combination of physical and logical components.

BRIEF DESCRIPTION OF THE DRAWINGS

FIG. 5 is a screenshot of a user interface allowing a user to generate a mapping between a user configuration and one or more individual field devices using a configuration system with contextual bulk transfer configuration operations.

FIG. 12 is a screenshot of a user interface provided by a configuration utility in the form of a Parameters to Send configuration screen that provides contextual bulk transfer configuration operations.

FIG. 14 is screenshot of a user interface provided by a configuration utility that may be used during a second type of field device parameter data retrieval during configuration activities.

FIG. 15 is a screenshot of an example user interface provided by a configuration utility that indicates field device parameters made up of one or more bit enumerated parameters.

FIG. 16 is a diagrammatic view of one exemplary computing environment upon which the asset management system illustrated with respect to FIG. 2 may be embodied.

DETAILED DESCRIPTION

A configuration system generally includes a configuration utility that provides a template or generic configuration that defines configuration information for a plurality of intelligent field devices of the same type and that provides a method to apply the template to one or more connected and commissioned intelligent field devices or to a virtual device (i.e., a place holder established during a process plant project) using bulk transfer operations. Importantly, the configuration system enables the user to configure field device parameter changes while viewing contextual information about the field device to thereby assist the user in finding and configuring the appropriate field device parameters during configuration activities. Embodiments provided herein accordingly provide a manner for a user employing an asset management system to configure multiple intelligent field devices at substantially the same time and to simultaneously mark or apply the configuration data to the field devices in a bulk transfer operation. By employing such a template, user corporate standards can be easily defined and implemented across a process plant unit, across an entire plant, or across an entire enterprise.

Figure 1:
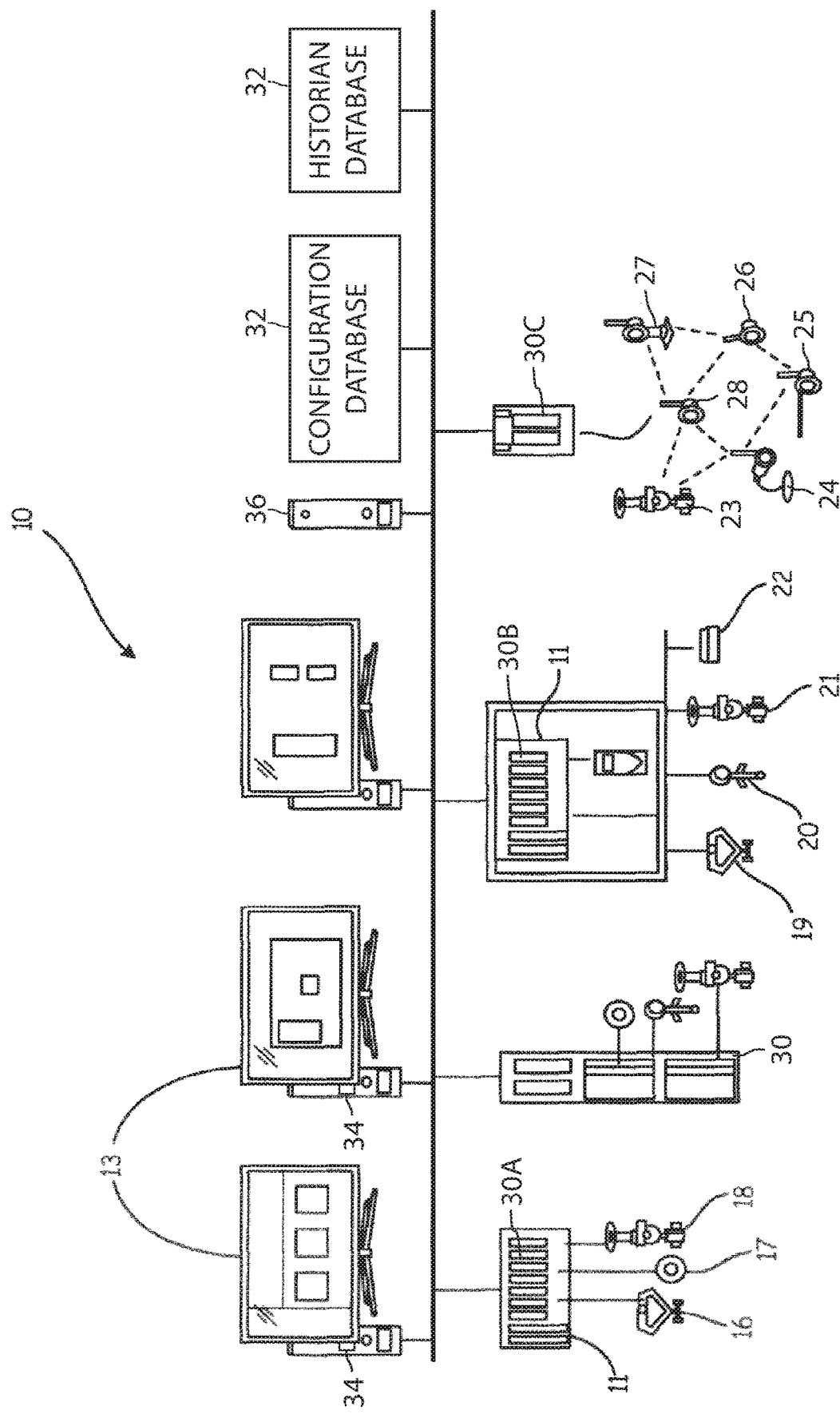
FIG. 1 is a diagrammatic view of a process control and monitoring system employing a number of intelligent field devices in which a configuration system with contextual bulk transfer configuration operations can be used.

FIG. 1 is a diagrammatic view of a process control and monitoring system 10 in which embodiments of the configuration system described herein can be used. The process control and monitoring system 10 of FIG. 1 includes one or more process controllers 11 coupled to one or more host workstations or computers 13 (which may include any suitable computing devices) each having a user interface that includes a screen and a user input device. The process controllers 11 are also coupled to intelligent field devices 16-28 through suitable input/output cards or modules 30. The process controllers 11 may be any suitable types of process controllers such as distributed process controllers, PLCs, etc. The process controllers 11 as well as the other communication interface devices 30 illustrated in FIG. 1 are communicatively coupled to host workstations 13 via, for example, an Ethernet connection or any other suitable data communication highway using any suitable communication protocol. Likewise, the process controllers 11 and communication devices 30 are communicatively coupled to the intelligent field devices 16-28 using a suitable smart communication protocol, such as the FOUNDATION™ Fieldbus protocol (e.g., field devices 19-22), the HART® protocol (e.g. field devices 16-18), the WirelessHART® protocol (e.g., field devices 23-28), etc. Additional examples of digital communication networks include communications on a MUX network, a Wireless Gateway network, a modem network, or any other suitable digital communication network.

The intelligent field devices 16-28 may be any suitable type and/or brand of intelligent field devices, such as process variable transmitters, valves, positioners, etc. The input/output cards or modules 30 may be any suitable type of devices that conform to a standard process communication protocol. For example, one I/O card 30A may be a HART® I/O card that communicates in accordance with the HART® protocol with intelligent field devices 16, 17, and 18. Additionally, another I/O card or module 30B may be a FOUNDATION™ Fieldbus card allowing a process controller 11 to communicate in accordance with the FOUNDATION™ Fieldbus protocol to intelligent field devices 19, 20, 21, and 22. Likewise, another I/O card or module 30C may be a WirelessHART® gateway that communicates in accordance with the WirelessHART® protocol to intelligent field devices 23-28.

The process controllers 11 each includes one or more processors that implement or oversee one or more process control routines (stored in memory) and that communicates with intelligent field devices 16-28 and the host computers 13 to control a process in any desired manner. Thus, the process controllers 11 and the associated communication interfaces enable the workstations 13 to interact with the process 10 via intelligent field devices 16-28. The process controllers 11 and any I/O modules 30 employed therein or therewith are shown as one exemplary environment where communication with a plurality of field devices is performed. However, the configuration system described herein can be used in any environment where digital communication with a plurality of intelligent field devices is possible through any suitable communication interface(s).

Moreover, as illustrated in FIG. 1, the plant 10 can include one or more databases 32, such as configuration databases, historians, etc., that collect data from the plant and from the workstations 13 for use in configuring and controlling the plant 10 or the devices within the plant 10. Still further, one or more configuration applications, utilities, or systems 34 can be stored in a memory of the workstations 13 (or a server 36 connected thereto) and can be executed on one or more processors of the workstations 13 (or a server 36 connected thereto) to perform configuration activities such as those described in more detail below.

Figure 2:
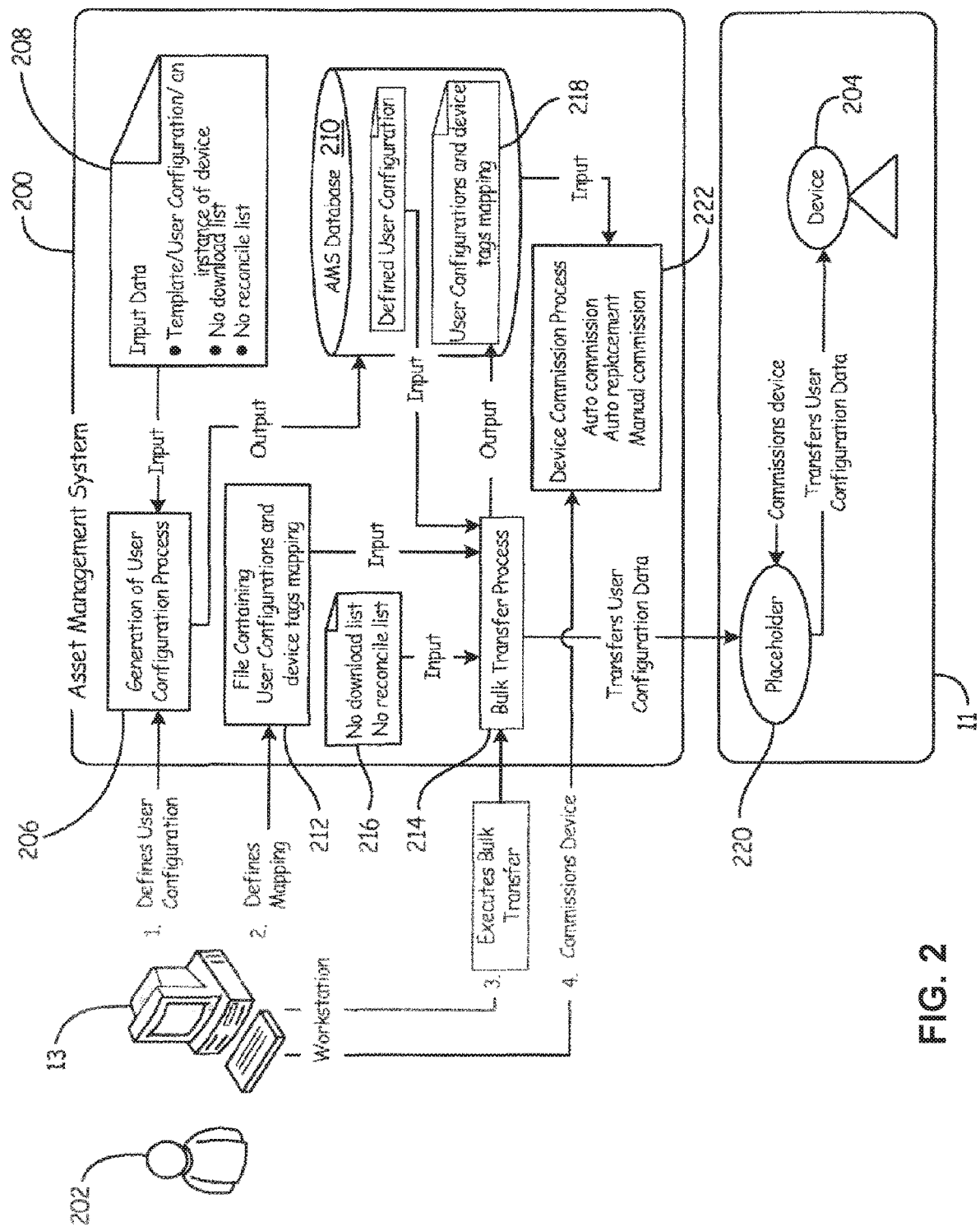
FIG. 2 is a diagrammatic view of an operator interacting with an asset management system in order to set up bulk transfer operations on a plurality of field devices using a bulk transfer configuration system described herein.

FIG. 2 depicts a diagrammatic view of a user 202 interacting with an asset management system 200 (that may generally be implemented in one or more of the workstations 13, the configuration and historian databases 32, the server 36, etc., of FIG. 1) to perform bulk field device configuration operations. The asset management system 200 generally includes one or more software applications executing on one or more workstations 13 to provide high-level interaction between the user 202 and the individual intelligent field devices of the process control and monitoring system 10 (of FIG. 1). Such high-level interaction may include performing diagnostics, maintenance, configuration, etc., activities in the plant 10. While the workstations 13 may have one or more asset management system applications running locally, a user may interact with the asset management system 200 remotely via a data communication network. Thus, the user 202 seated at the workstation 13 can interact with the asset management system 200 in order to perform a variety of high level functions relative to a set of intelligent field devices 204 (which may be any of the field devices 16-28 of FIG. 1) regardless of the physical location of the user 202.

Generally, the user 202 is able to generate a user configuration process 206 where the user provides a template/user configuration as well as an instance of an intelligent field device, as illustrated diagrammatically at a reference numeral 208. A user configuration is a set of device parameters customized by a user to be used as a model for other device configurations. Additionally, the user 202 can provide additional input, such as a "no download" list and a "no reconcile" list. These lists are lists of intelligent device parameters that may be exempted from application of the bulk operation. Once the user 202 has provided the requisite information, the user configuration is stored in a configuration database (such as the configuration database 34 of FIG. 1) in any suitable format. In the system illustrated in FIG. 2, the user configuration is stored in an asset management system database 210. Next, the user 202 defines a mapping relative to the defined user configuration. This mapping is a file or other suitable data structure that links the user configuration to individual device tags or other identifiers of intelligent field devices. This operation is illustrated at a reference numeral 212 in FIG. 2. Thereafter, the user 202 (or another user) may use the configurations to specify, set, or change field device parameter values for various ones of the field devices specified by the configurations and mappings. Next, the user 202 executes a bulk transfer or download operation as illustrated at a block 214 to apply the new parameter values to the field devices.

In the system illustrated in FIG. 2, the bulk operation is a bulk transfer of user configuration information to a plurality of field devices. The bulk operation takes as inputs a no download/no reconcile list 216, the mapping file created at the block 212, and the defined user configuration data as stored in the asset management database 210. However, the configuration system described herein can be implemented such that the database 210 is a database of a suitable control system. The bulk transfer process 214 then provides, as an output, a number of user configurations and device tags mappings 218 which are also preferably stored in the asset management database 210 (e.g., the configuration database 34 of FIG. 1). Additionally, the bulk transfer utility 214 may transfer user configuration data to one or more placeholders 220 within the process controller 11. These placeholders may store the configuration data and the controller 11 may download the configuration data to the appropriate field device at a later or appropriate time via standard controller communications. Finally, as illustrated at a block 222, the user 202 engages the device commissioning process. When this operation occurs, the asset management system 200 receives the stored user configurations and device tags mapping from the asset management database 210 and automatically applies the user configuration information to the intelligent field devices (e.g., devices 16-28 of FIG. 1) having device tags that match the device tags set forth in mapping 218. In this manner, the user 202 can engage a process that configures a significant number of field devices automatically or simultaneously without having to address each intelligent field device 16-28 individually.

Figure 3:
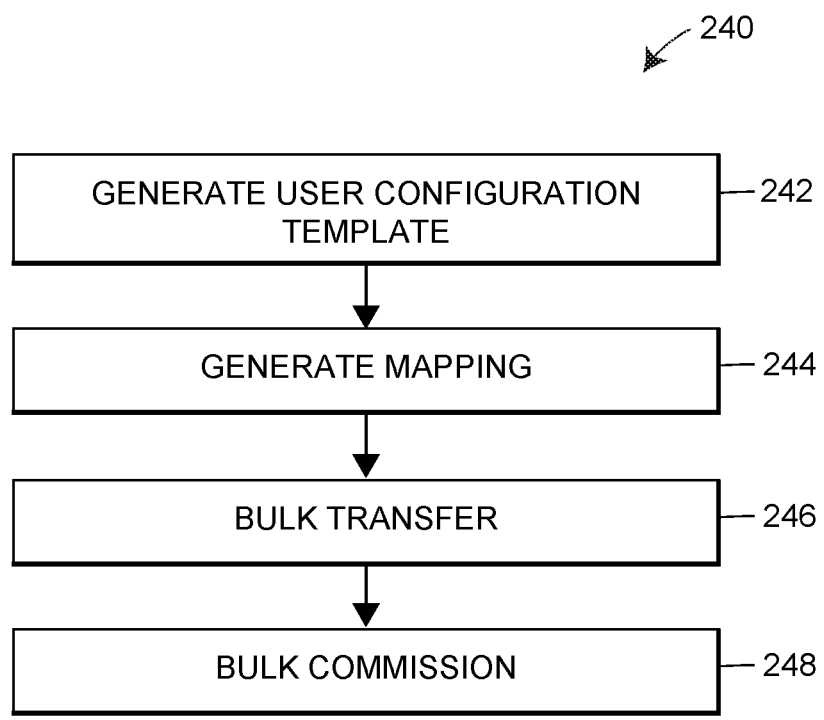
FIG. 3 is a flow diagram of a method of bulk configuration of intelligent field devices using a configuration system with contextual bulk transfer configuration operations.

FIG. 3 depicts a flow diagram of a method of bulk configuration of intelligent field devices using a configuration system described herein. The method 240 begins at a block 242 where a user (such as the user 202) generates a user configuration template. In creating the template, the user 202 can easily define and implement suitable corporate standards across an individual processing plant unit, an entire processing plant, or an entire enterprise. At a block 244, the user 202 generates a mapping table of the template or templates defined at the block 242 to one or more intelligent field devices. The intelligent field devices can be specified by any suitable identifier, such as device tags or some other suitable identifier. Additionally, the mapping can be stored in any suitable format, such as a Microsoft Excel spreadsheet, or any suitable data structure. Next, at a block 246, the configuration system, in response to a user input or at periodic or prescheduled times, initiates a bulk transfer of the configuration information as stored in the configuration database for the asset management system 200. At a block 248, a bulk commissioning of the field devices is performed wherein each individual field device is provided with the configuration information stored in the user template that is mapped to that respective intelligent field device. While the bulk commissioning of the field devices may occur simultaneously, it may also occur sequentially, as long as no further user interaction is required as the bulk operation steps through each intelligent field device. Thus, from the perspective of the user 202, a single command to execute the bulk commissioning or configuration of the intelligent field devices will result in the operation being automatically performed, either in parallel or sequence on the specified intelligent field devices.

Figure 4:
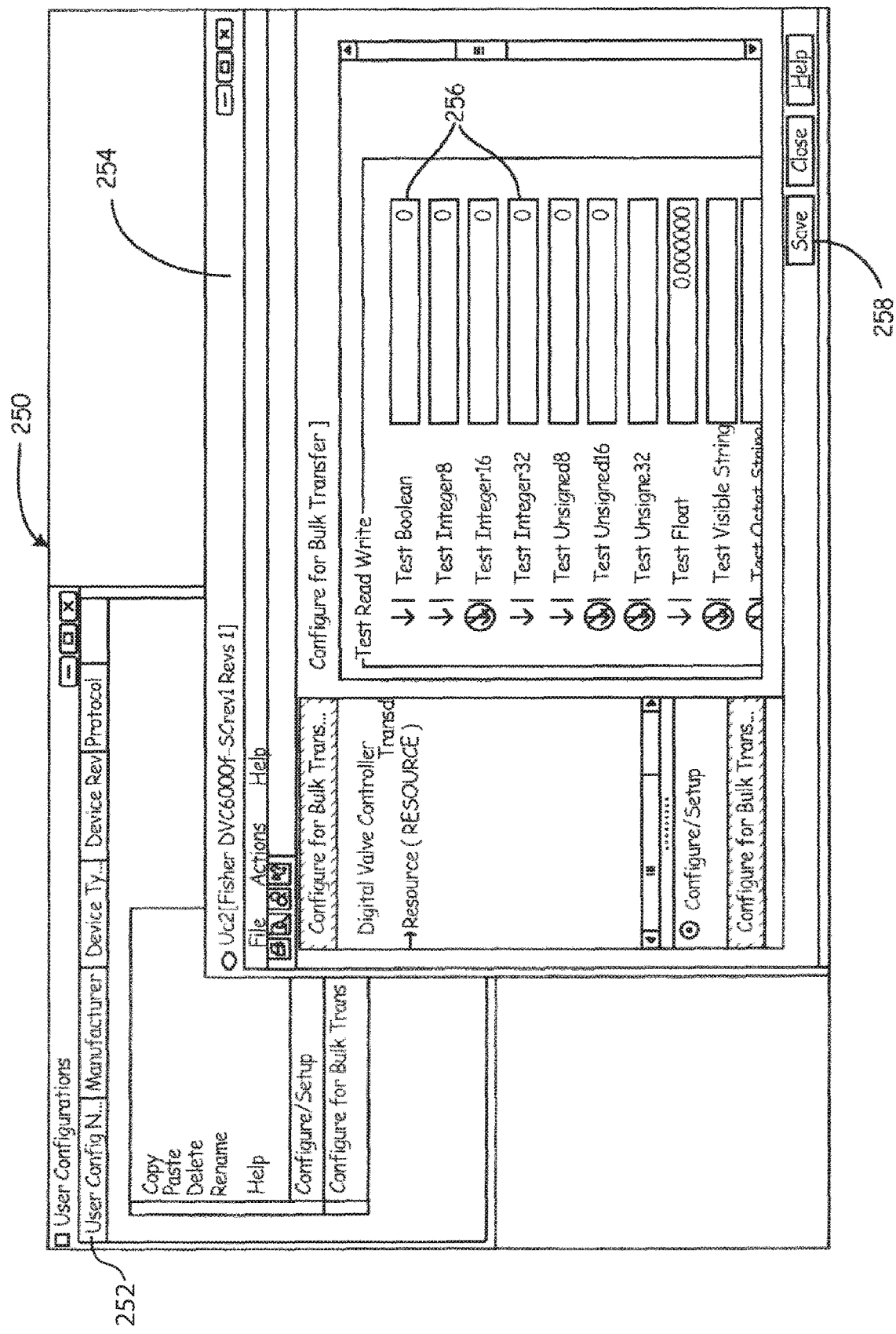
FIG. 4 is a screenshot of a user interface allowing a user to define a configuration template that can be applied to a plurality of field devices using a configuration system with contextual bulk transfer configuration operations.

FIG. 4 depicts a screenshot of a user interface 250 allowing a user to generate one or more user configurations in accordance or using a configuration system or utility as generally described herein. The user interface 250 has a user configuration name column 252 under which two distinct user configurations are listed. Specifically, uc1 and uc2 are shown in FIG. 4. Additionally, a dialog box 254 is illustrated allowing a user to configure block transfer for a selected user configuration (in this case uc2). A number of field device parameters are illustrated as well as windows 256 that receive values for such parameters. After the user has entered or otherwise configured the user configuration for bulk transfer, the user configuration may be saved via a button 258.

Figure 5:
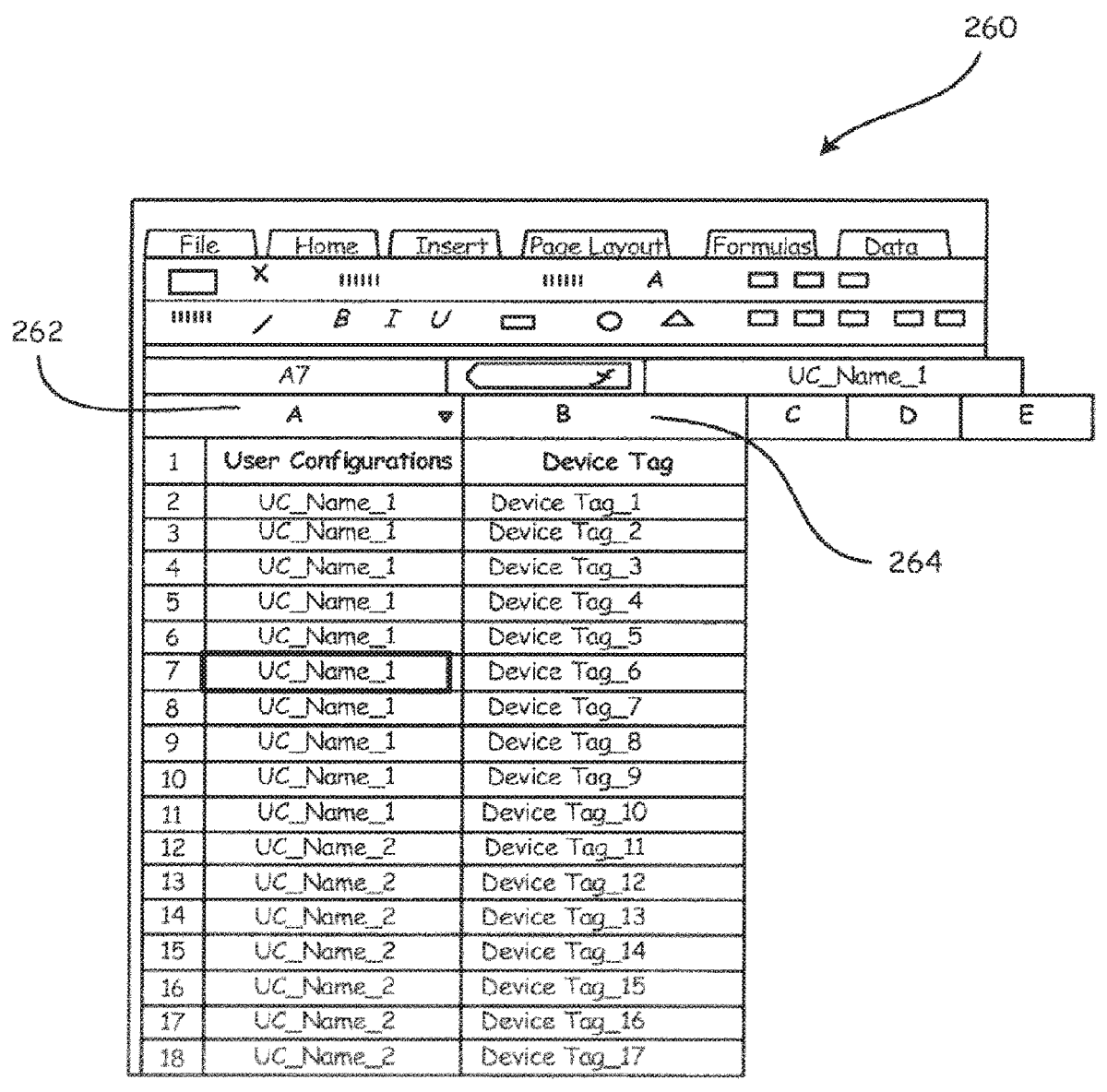

FIG. 5 depicts a screenshot 260 of a mapping of user configurations to device tags as can be performed using the configuration system or utility described herein. In the screenshot 260, a number of user configurations are set forth in a column 262, while a number of device tags are set forth in a column 264. In the mapping illustrated in FIG. 5, each row (such as row number 2) provides or defines an association between the specified user configuration and the listed device tag. For example, in the highlighted row 7, user configuration "UC_Name_1" is associated with "Device_Tag_6." However, as set forth above, the mapping between one or more intelligent field devices and a given user configuration can be provided in any suitable format. In the system illustrated in FIG. 5, the mapping is provided in a document such as a spreadsheet, such as that sold under the trade designation Excel available from Microsoft Corporation of Redmond, Wash.

Figure 6:
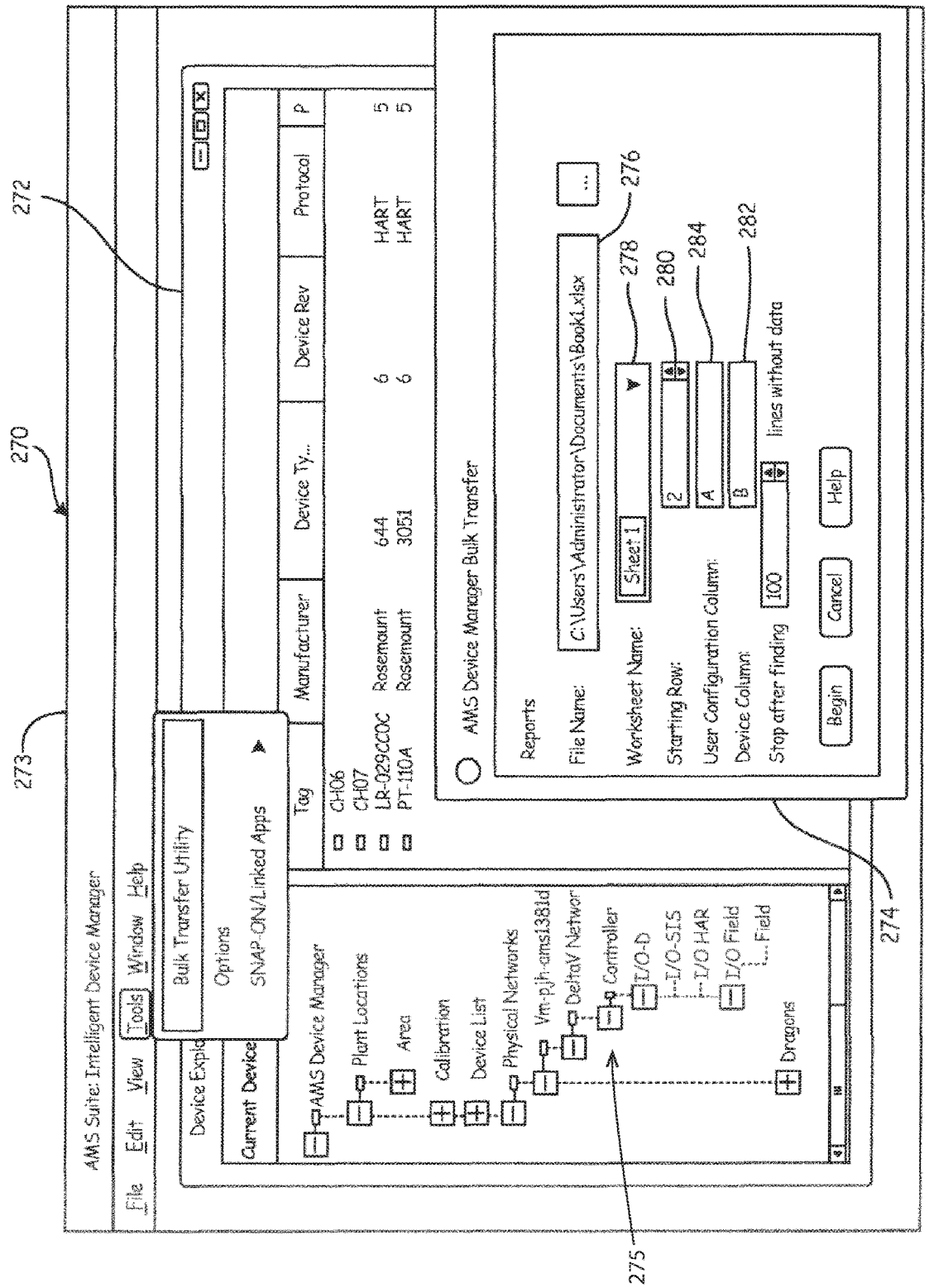
FIG. 6 is a screenshot of a user interface provided by a configuration utility that allows a user to execute bulk transfer operations on a plurality of field devices.

FIG. 6 depicts a diagrammatic screenshot 270 of a user interface allowing a user to begin a bulk operation on a plurality of field devices using a configuration utility or system. The screenshot 270 includes a "device explorer" window 272 that lists or otherwise enumerates the various intelligent field devices supported by the AMS Suite: Intelligent Device Manager 273. As illustrated in FIG. 6, these intelligent field devices can be enumerated hierarchically (in a navigation pane or a plant navigational hierarchy 275) based upon plant locations, individual plants, and individual equipment. Of course, other manners of locating or finding particular field devices could be used as well or instead. The screenshot 270 also illustrates a dialog window 274 provided to initiate bulk commissioning of a plurality of intelligent field devices of the same type. The dialog window 274 includes a file name field 276 that specifies a file containing the mapping of the various field devices to one or more defined user configuration templates. Additionally, the dialog window 274 may include a worksheet name field 278 that defines the worksheet within the file that has the mapping information. However, as set forth above, any suitable data structure or file format can be used for the mapping function. Additionally, a field 280 is provided to allow the user to define a portion of the mapping to be excluded. For example, row 1 may contain a header, and thus will not contain a user configuration and field device mapping. Accordingly, exempting row 1 from the bulk operation ensures robust execution of the operation, by defining the starting row as row 2. The dialog window 274 also includes a Device Column field 282 which enables a user to indicate the specific column in the worksheet specified in the field 278 of the file 276 that contains the specific intelligent field device identifiers, such as device tags. Similarly, a field 284 enables the user to specify the user configuration column. In the example illustrated in FIG. 6, the user configuration column is selected as column A, while the device column is selected as column B. Referring back to the screenshot 260 of FIG. 5, the user configuration information is set forth in column A, while the device tag information is set forth in column B. Additionally, row 1 of the worksheet illustrated in the screenshot 260 includes header information, and thus should not be executed during the operation. Accordingly, the bulk transfer information entered into the dialog box or window 274 is appropriate for the mapping file illustrated with respect to FIG. 5.

Figure 7:
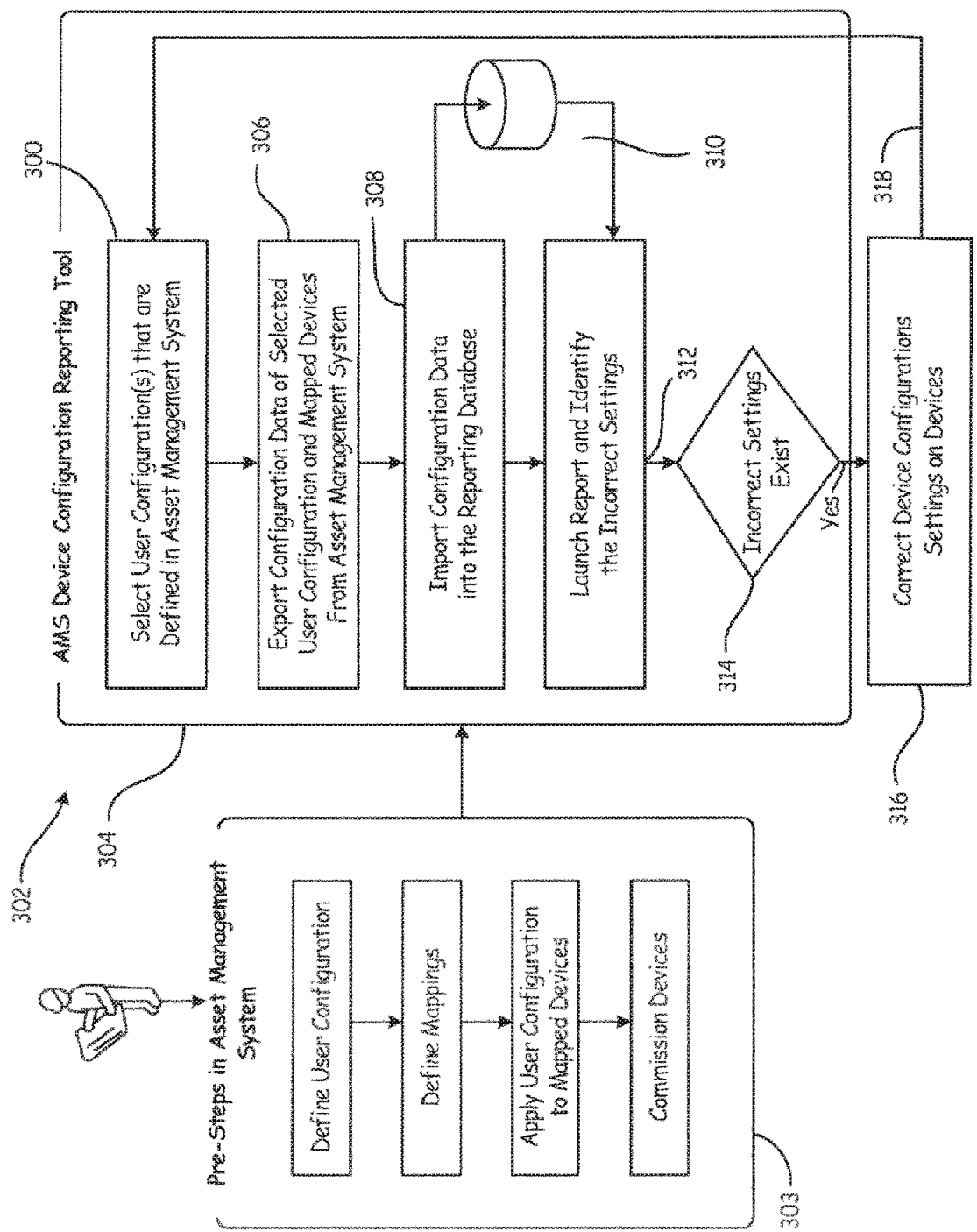
FIG. 7 is a diagrammatic view of a method of verifying and/or validating intelligent field device configuration information.

FIG. 7 is a diagrammatic view of a method of executing a bulk verification and/or validation operation on a plurality of intelligent field devices in accordance with an embodiment of the present invention. Before the method 300 begins execution by a reporting tool 302, a number of preliminary steps are required, as set forth at a block 303. Specifically, one or more user configurations must be defined with respect to one or more respective individual intelligent field devices. Furthermore, each intelligent field device must be mapped to a user configuration. Further, the user configuration should be applied to the mapped intelligent field devices, and the intelligent field devices should be commissioned in accordance with the user configuration. Of course, all of this field device definition, template definition, and mapping information is stored in the configuration database 34.

As will be understood, the reporting tool 302 provides an efficient manner for a user to verify if intelligent field devices are configured in accordance with the user configuration specified for each respective intelligent field device. Thus, the user need not interact with each intelligent field device individually in order to provide such verification. As can be appreciated, verifying the device configuration settings for hundreds or even thousands of intelligent field devices using traditional methods is very time consuming. Accordingly, employing the method 300 significantly reduces the time required to provide such verification.

The method 300 begins at a block 304 where a user selects one or more user configurations that are defined in the asset management system. As set forth above, these user configurations are defined by the user and are typically stored in asset management database 210 (e.g., the configuration database 34 of FIG. 1). At a block 306, the reporting tool 302 exports configuration data of one or more selected user configurations as well as mapped devices from the asset management system. (This configuration data may be applied or specified by a user using configuration screens described in more detail below). At a block 308, the configuration data is imported into a reporting database 310, or other suitable storage facility. Alternatively, the configuration data could be retrieved from live field devices and imported into a standardized format, such as XML. At a block 312, the configuration data of each individual intelligent field device is compared with that specified in the applicable user configuration template, and a report identifying discrepancies and/or incorrect settings is generated. If any incorrect settings exist, as determined at block 314, the user is prompted, at a block 316 to correct device configuration settings on the specified intelligent field devices. After such correction has been performed, the reporting tool 312 repeats the method 300 by returning to block 304, as illustrated at a line 318.

After the user or configuration engineer has set up the configuration system by defining user configurations, field devices mappings, etc. as described above, and after the user or configuration engineer has tested as saved all of the bulk configuration information in the configuration database, the configuration system enables the same or different users to thereafter change the configuration data for individual field devices and to set these changes up for bulk transfer or download. In particular, it would be disadvantageous and very time consuming to redownload all of the field device parameters of a particular field device when only one or a few of these parameters are changed. As a result, the user must first change configuration data for one or more parameters within a field device and then must mark those parameters to be included in a bulk transfer operation.

As indicated above, a known or current configuration utility that enables bulk transfer operations operates to enable a user to change configuration data for particular field device in a first traditional configuration screen or set of screens and to then mark the edited field device parameter for bulk transfer in a separate bulk transfer utility. In this case, the configuration system provides the user with a traditional configuration system that enables the user to navigate to a particular field device (e.g., using the navigation hierarchy 275 of FIG. 6) and to select a field device for configuration changes. At this point, the configuration utility provides the user with a configuration screen listing the various field device parameters associated with the selected field device, and enables the user to make changes to those parameters values.

Figure 8:
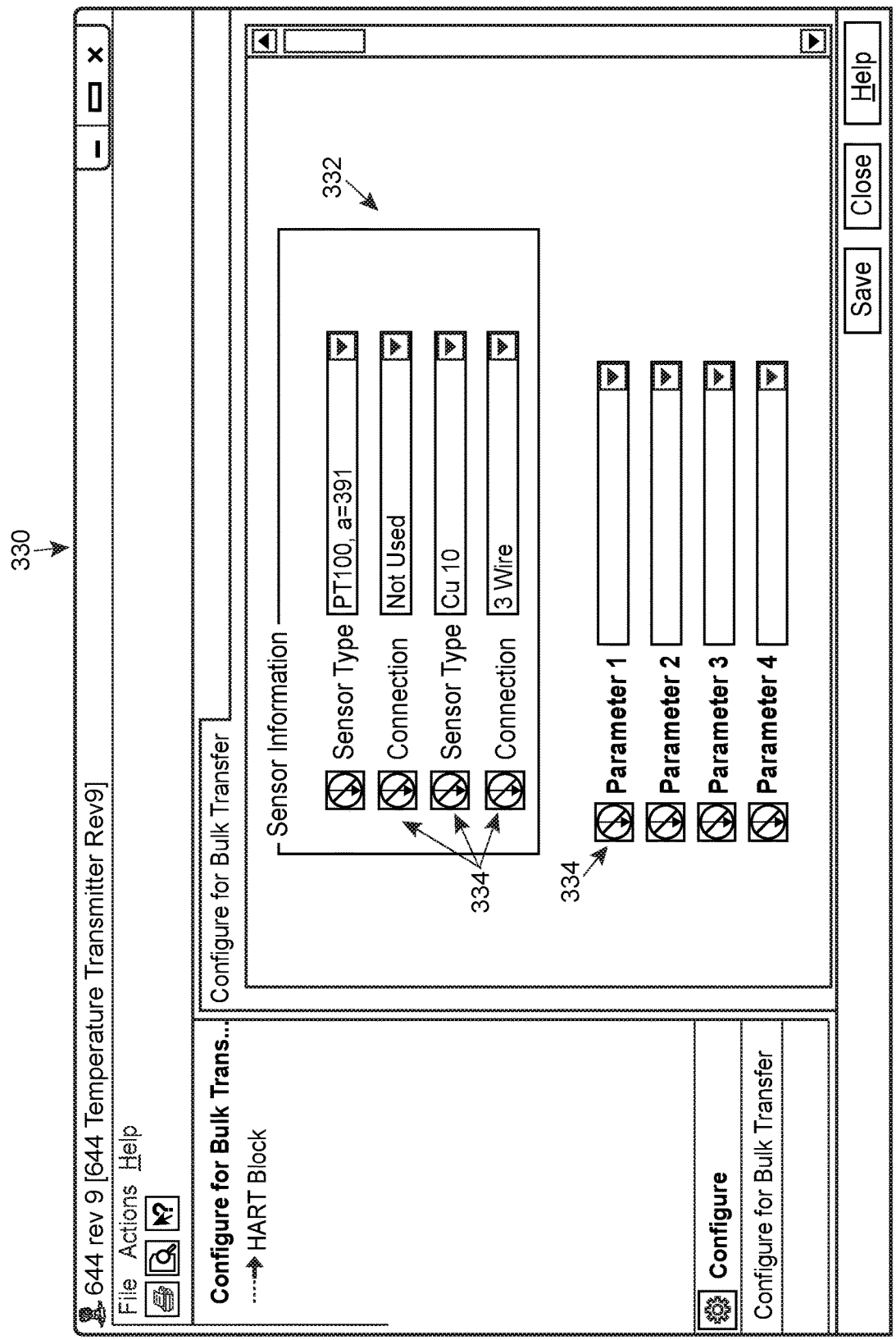
FIG. 8 is a screenshot of a known configuration system that enables a user to navigate to and change field parameters and to set up these changes for bulk transfer operations.

However, to configure the edited parameters for bulk transfer, the user must pull up or open a separate bulk transfer utility to perform this function. FIG. 8 illustrates an example screenshot 330 produced by such an available bulk transfer configuration utility that enables a user to configure one or more parameters to be included in a bulk transfer operation. In particular, in this case, the user had to scroll through a device hierarchy to select a particular HART device (a 644 Temperature Transmitter Rev9) and select the Configure for Bulk Transfer utility. In this case, the bulk transfer configuration utility provided the screen 330 with all of the device parameters listed in a tab view 332. Some of the field device parameters are grouped together at the top, while some of the field device parameters are presented by themselves in a list below the grouped parameters. Generally speaking, the parameter groupings may be determined by the manner in which the parameters are obtained from the device description provided by the manufacturer.

Now, if the user wants a particular parameter to be configured to be sent during a bulk transfer process, the user needs to locate this parameter by scrolling through all the device parameters in the screen or view 332 and selecting (toggling) a bulk transfer status icon 334 to mark the device parameter for bulk download or transfer. However, the use of this bulk transfer configuration utility is difficult for the user. In particular, the grouping of device parameters is often generic and not straightforward to the user. As such, the user typically needs to switch between the Configure and the Configure for Bulk Transfer screens of the configuration utility to verify that the targeted parameter in the Bulk Transfer screens is the correct parameter to mark for bulk transfer. However, and in addition, if a device has a lot of parameters, e.g., more than 100 parameters, browsing through all of the field device parameters in the bulk transfer screen 330 of FIG. 8 is difficult. Still further, the user has difficulty in checking which parameters were marked for bulk transfer as the user must use the bulk transfer screen or utility to verify this status of the parameter. Additionally, the user needs to perform two actions when he or she wants to change a parameter and to then send that edited parameter in a bulk transfer operation, including modifying the parameter value (e.g., in the configuration screen) and then clicking on the bulk transfer status button or icon 334 in the bulk transfer screen to set the parameter for bulk transfer.

Thus, as one example of the operation of the currently known configuration utility using bulk transfer, the user first opens a configure screen of a device template, navigates to the correct location in the navigation pane for the device, navigates to the correct page in the configuration screen and then navigates to the target field device parameter. The user then modifies the value field of the device parameter, which causes the configuration utility to mark the parameter as "edited" and to provide the user Save and Cancel buttons on the device screen. The user may select the Save button, for example, to save the configuration to the configuration database. However, now the user must open the Configure for Bulk Transfer utility, must scroll through the parameter list such as that shown in FIG. 8, to search for the modified parameter, and must then modify the bulk transfer status icon 334 of the target parameter in the Configure for Bulk Transfer screen. The parameter will then be marked as edited and the utility will provide the Save and Cancel buttons on the device screen. Again the user selects the Save button to now mark the parameter for bulk transfer and to save it to the configuration database in a manner that this parameter will be sent in a bulk transfer operation, when initiated. As will be understood, this process is time consuming and tedious.

To reduce or alleviate these issues, a new configuration utility described herein manages configuration data retrieval and presents one or more configuration screens in a manner that enables a user to more easily navigate to, locate, edit, and mark a device parameter for bulk transfer. More particularly, this new configuration utility presents information about the various field device parameters with some contextual information about the field device in which these parameters are found, such as with field device component data, in addition to enabling a user to easily see and change bulk transfer status for each such field device parameter. The field device contextual information may include information about components (sub-elements) of the field device to which the various field device parameters belong, thereby enabling a user to more easily find the correct field device parameter to edit and mark for bulk transfer.

In a general sense, the new configuration utility combines a standard configure utility that provides more standard configuration screens and a configure for bulk transfer utility in a manner that makes it easier for the user to find the correct field device parameters for editing, marking those parameters for bulk transfer, and viewing the parameters that are marked for bulk transfer. Generally, in the new configuration utility, various ones of the field device parameters for a field device are grouped according to the DD layout so that, in a layout view, the users will still see a typical layout screen or view, and they will know exactly which parameters they want to mark for bulk transfer without being overwhelmed with other field device parameters. To effect this operation, the configuration utility provides, for each field device, a layout view that will give the users a familiar experience by providing certain field device parameters with contextual information to which field device component the field device parameters relate. Generally, the contextual information may be provided based on the device DD which defines the different field device components and major field device parameters related to each such component. However, instead of also providing a list of additional field device parameters in the layout view, the configuration utility provides an "Other Parameters" view that includes all of the field device parameters that are not within the layout view. This other parameters view makes it easier for a user to find minor or less used field device parameters that may not be associated with a particular component or sub-element of the field device. Still further, the configuration utility may provide a "Parameters to Send" view which can be used by the user to review (and change) all of the parameters that are currently marked for bulk transfer. As part of these views and operation, the configuration utility may automatically set the value of an "IsMarkedForBulkTransfer" or a bulk transfer status to true when the value of the field parameter is modified in any of the views, i.e., within the layout view or the other parameters view. The user will still have the capability to manually modify the IsMarkedForBulkTransfer or other bulk transfer status by clicking on an easily visible bulk transfer status icon or button in any of the views.

Figure 9:
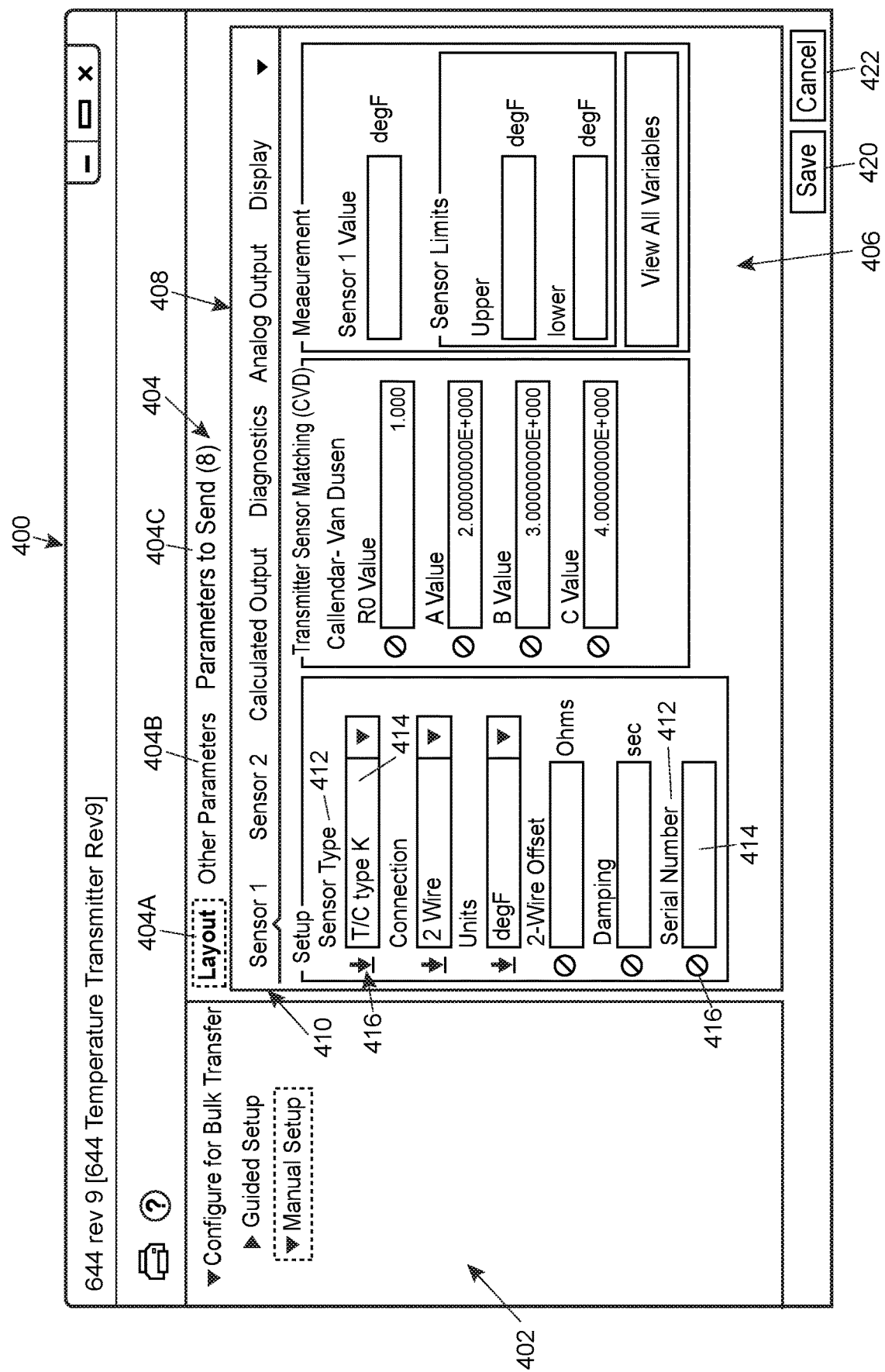
FIG. 9 is a screenshot of a user interface provided by a configuration utility in the form of a Layout View configuration screen that provides contextual bulk transfer configuration operations.

Examples of the various views provided by the new configuration utility are illustrated in screenshots depicted in FIGS. 9-12. In particular, FIG. 9 illustrates a screenshot 400 that may be provided by the configuration utility described herein as part of the Layout view generally described above. In particular, the screenshot 400 illustrates various ones of the configurable field device parameters for the 644 Temperature Transmitter Rev9 field device illustrated in FIG. 8.

Generally speaking, the configuration utility (which can be any of the applications or utilities 34 of FIG. 1) provides a navigation screen that enables the user to navigate to a desired field device for configuration. The navigation screen may include various different levels or selections in a plant hierarchy (such as that illustrated in the navigation hierarchy 275 of FIG. 6), and this navigation hierarchy may include plants (when more than one plant is available), areas (of each plant), units (within each area), devices (within each unit), controllers, etc. Of course, any desired hierarchy or manner of scrolling through a configuration database to locate a desired field device may be provided or used. When the user selects a particular field device for configuration, the configuration utility may provide a configure for bulk transfer device screen 400, such as that illustrated in FIG. 9. As depicted in FIG. 9, the configuration utility produces the device screen 400 for the particular device, and the screen 400 includes a navigation pane 402, a set of tabs 404, and a viewing pane 406. In this case, the tabs includes a Layout View tab 404A, an Other Parameters tab 404B, and a Parameters to Send tab 404C. The configuration utility provides information in the viewing pane 406 based on the particular tab 404 that is selected.

In the example illustrated in FIG. 9, the layout view tab 404A is selected and, as a result of this selection, the configuration utility provides a set of sub-tabs 410, one for each of the major field device components. Generally speaking, a field device may include one or more main components, such as sensors, blocks, calculated outputs, diagnostics, alarms, display, or other logical or physical entities in the field device. Generally, the field device components, such as sensors, blocks and other logical device components are defined in the device description (DD) of the field device and these components define the main field device parameters of the device. In other words, the field device parameters of these device components are generally the most accessed and configured field device parameters, and these field device component parameters are provided in the Layout view. In the example of FIG. 9, the Layout view includes sub-tabs for six particular field device components, including a Sensor 1, a Sensor 2, a Calculated Outputs, a Diagnostics, an Analog Output, and a Display component. Of course, other field device components may be available or accessible via an arrow selection icon shown in the same row as the sub-tabs 410 in FIG. 9. Importantly, the sub-tabs 410 provides a first layer of contextual information about the field device components for the selected field device by defining a set of field device components for which a layout view exists. The user can then select any of the field device component sub-tabs 410 to view field device parameters limited to (related to) the selected field device component.

In this example, the Sensor 1 sub-tab is selected and so the configuration utility provides, in the viewing pane 406, the various field device parameters that are associated with the Sensor 1 component, including a name 412 for these parameters, an editable value field 414, and a bulk transfer status icon 416. For ease of viewing, only two of the field device parameters in FIG. 9 are marked with the reference numbers 412, 414, and 416. Of course, the configuration utility may obtain the field device name, value and bulk transfer status from the configuration database as part of the configuration template. Moreover, the Layout view may include further contextual information about the various Sensor 1 related field device parameters in the viewing pane 406, such as separate boxes indicating the Setup parameters for the Sensor 1, the Transmitter Sensor Matching (CVD) parameters for Sensor 1 and the Measurement parameters for Sensor 1. These groupings or boxes provide a second layer of field device component contextual information to assist the user in locating a particular field device parameter during configuration activities.

As will be understood, the user can now scroll or navigate within the viewing pane 406 to find the parameters of interest, or the types of parameters of interest, that are related to the selected field device component (in this case Sensor 1) and can alter the values of those field device parameters by entering new values into the field device parameter value fields 414. Of course, the configuration utility tracks the user's entries and, when a user modifies the value of a field device parameter, the configuration utility automatically changes the bulk transfer status icon or variable 416 for the edited parameter to indicate that the parameter is marked for bulk transfer. The configuration utility may indicate this change in the bulk transfer status icon by changing the bulk transfer icon (i.e., the IsMarkedForBulkTransfer icon 416) for the edited field device parameter to indicate that the parameter is marked for bulk transfer. In the example of FIG. 9, the bulk transfer status icon is illustrated as either being an arrow with a line underneath (meaning that the parameter is marked for bulk transfer) or a circle with a line through it (meaning that the parameter is not marked for bulk transfer). Thus, the parameters in the viewing pane 406 of FIG. 9 with the ⬇ icon are or have been edited and are marked for bulk transfer. After a first one of the field device parameters is edited (and automatically marked for bulk transfer), the configuration utility provides Save and Cancel buttons 420 and 422 on the device screen 400 to enable the user to save or cancel the edits.

Of course, the user may modify other parameter values in the viewing pane 406, may switch to other field device components specified by the other sub-tabs 410 in the viewing pane 406 to view and change field device parameters associated with these field device components, etc. As the user modifies the other field parameter values, the IsMarkedForBulkTransfer statuses for those field device parameters are changed to be configured for bulk transfer, and the bulk transfer status icons 416 of the modified field device parameters are set to ⬇ to indicate that these parameters are marked for bulk transfer. If desired, the user may toggle the bulk transfer status of a field device parameter (e.g., by selecting the bulk transfer icon 416) to change the bulk transfer status of a field device parameter to be included or not included in a bulk transfer, if so desired.

At some point, after the configuration edits have been made in the layout view to any of the field device parameters for any of the field device components (as listed in the sub-tabs 410 of the Layout view), the user selects the Save button 420, and the configuration utility saves the new data and the marked for bulk transfer status of each of the field device parameters to the configuration database. At this point, the configuration utility removes or hides the Save and Cancel buttons 420, 422 on the device screen 400.

As will be understood, the Layout view configuration screen, such as the screen 400 of FIG. 9, provided by or produced by the configuration utility, enables a user to easy find particular field device parameters that the user is trying to configure because the Layout view provides the user with field device component contextual information within the same view along with the bulk transfer status of the field device parameter. This feature prevents the user from needing to scroll through an entire list of field device parameters for a field device to find a particular field parameter of interest. More particularly, a Layout view such as that of FIG. 9 includes information regarding field device components via the tabs 410 and allows the user to drill down into a particular field device component (such as a particular sensor, calculation, diagnostic capability, output, function block, etc.) and view only the field device parameters associated with that component. Still further, the configuration utility may group field device parameters related to a particular field device component according to a particular type or function (e.g., a setup function, a measurement function for a sensor, etc.) in the viewing pane 406, as is indicated by the boxes within the viewing pane 406 of FIG. 9. Of course, the particular field device components provided in the sub-tabs 410 and the particular groupings of parameter types provided in the viewing pane 406 will be different depending on the type and identity of the field device, as different field devices will have different components including different physical features (e.g., sensors, outputs, limits, actuators, etc.) and different logical features (e.g., alarms, calculations, diagnostics, display, etc.) Still further, while the sub-tabs 410 and boxes within the viewing pane 406 are illustrated as providing field device component contextual information, this or other field device component contextual information could be provided using other visual features in a configuration screen, such as within pull down menus, navigational hierarchies, etc. Thus, for example, the field device component to which the displayed parameters relate may be indicated in a navigational hierarchy in the area 402 of FIG. 9, for example, or in any other manner.

Figure 10:
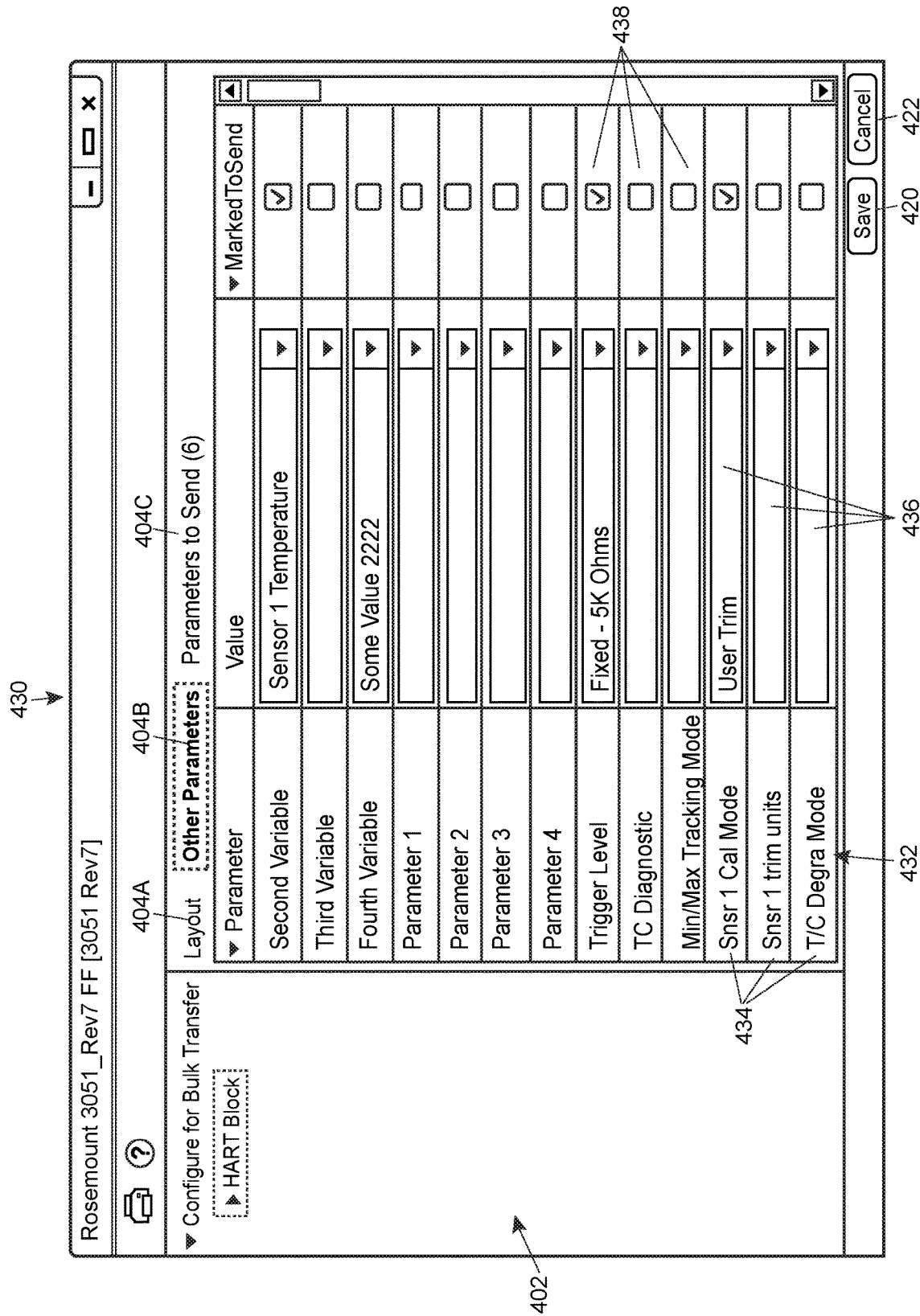
FIG. 10 is a screenshot of a user interface provided by a configuration utility in the form of a first example of an Other Parameters View configuration screen that provides contextual bulk transfer configuration operations.

As indicated above, not all of the field device parameters for a particular field device may be provided in a Layout view as there may be some or even many field device parameters that are not specifically related to a particular field device component or that may be related to field device components not listed or provided in the Layout view. In this case, the configuration utility may provide, and the user may select, the Other Parameters tab 404B to view and change device parameters (i.e., field device parameter values) not provided within the Layout views. FIG. 10 illustrates a device screen 430 that may be provided by the configuration utility under the Other Parameters tab 404B for the same device illustrated in FIG. 9. In this case, as illustrated in FIG. 10, the configuration utility provides a list of field device parameters 432 not provided or displayed in the Layout View. The list 432 includes a parameter value name 434, an edit field 436 and an editable bulk transfer status icon or field 438 for each such listed field device parameter.

In the example of FIG. 10, the user has opened the Configure for Bulk Transfer Device Screen 430, and has selected the "Other Parameters" tab 404B in the renderer pane and can navigate to any of the target field device parameters now displayed by the configuration utility in the field device list 432. The user may modify the value of any of the target parameters by changing or providing a new value in the edit box 436 of the target parameters. The configuration utility then automatically changes the bulk transfer status icon or field 438 to indicate that the parameter is edited and marked for bulk transfer. In the example of FIG. 10, the bulk transfer status icon 438 is illustrated as a check box with or without a check to indicate that the associated parameter is to be included or not included in a bulk transfer operation. The configuration utility also creates or enables (grays-in) the Save and Cancel buttons 420, 422 on the device screen 430 whenever an edit is made to a field device parameter value 436 or a field device bulk transfer status 438. Of course, the user may modify the values and the bulk transfer status of other parameters as desired. Of course, at some point, the user may select the Save button 420 and the configuration utility then saves the new data to the data source (configuration database) as being marked for bulk transfer according to the bulk transfer status icons or fields 438 for each field device parameter. At this point, as there are no newly edited parameters, the configuration utility will hide or grey-out the Save and Cancel buttons 420, 422 on the device screen 430.

It will be noted here that, in the example screen 430 of FIG. 10, the other parameters displayed in the list 432 all relate to a single HART function block within the selected field device. In this case, the single HART function block, which is a logical component of the field device, is illustrated in the navigational hierarchy or area 402. Again, this indication provides the user with contextual information about the field device parameters being displayed in the list 432 along with the bulk transfer status of these parameters.

Figure 11:
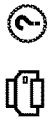
FIG. 11 is a screenshot of a user interface provided by a configuration utility in the form of a second example of an Other Parameters View configuration screen that provides contextual bulk transfer configuration operations related to Foundation Fieldbus function blocks within a field device.

As another example, FIG. 11 depicts a device screen 440 for a different field device, e.g., a Rosemount 3051 Rev 7 Foundation Fieldbus device that includes four different function blocks therein, including a Sensor Block, a Transducer Block, an Advanced Diagnostic Block, and a Resource Block. These blocks are illustrated in the navigational area 402 of the screen 440 with the Sensor Block being selected. As a result of this selection, the configuration utility presents a list 442 of field device parameters associated only with the Sensor Block in the viewing pane of the screen, when the Other Parameters tab 404B is selected. Thus, in this case, the configuration utility provides the user with field device component contextual information in the navigational hierarchy 402 to enable the user to find, edit, and view the parameter names, values, and bulk transfer status of each field device parameter of the selected field device component. Of course, if the user were to select a different function block in the hierarchy 402 of FIG. 11, the configuration utility would provide the field device parameters for that function block (and only that function block) in the list 442. Still further, a separate Layout view may be provided (under the Layout tab 404A) for each of the different function blocks listed in the hierarchy 402.

Still further, as indicated above, the configuration utility may provide a further view of the field device parameters that have been set up for bulk transfer operations to enable a user to easily determine (and potentially change) which field device parameters are currently set for bulk transfer operations. As an example, FIG. 12 illustrates a device screen 450 that may be provided by the configuration utility when the user selects the Parameters to Send tab 404C in, for example, one of the screens 400 or 430 of FIGS. 9 and 10. In this view, the configuration utility provides a list of all of the parameters that are currently configured for bulk transfer operations and the most recently edited value of those parameters. Thus, as illustrated in FIG. 12, the screen 450 includes a viewing pane 451 that depicts a list 452 of all of the device parameters in the selected field device. In this example, the list 452 includes table having columns indicating a parameter name 456, a parameter value 458, and a bulk transfer status (MarkToSend) 460. Of course, to generate this list 452, the configuration application or utility searches the configuration database for all of the parameters for the selected field device that are marked for bulk transfer, i.e., that have a bulk transfer status set to be included in a bulk transfer. Using the screen 450, the user can change values for the parameters using the value fields 458 and can select or unselect (toggle) the bulk transfer field or icon 460 to change the bulk transfer status of a field device parameter.

Thus, when the user opens the Configure for Bulk Transfer Device Screen and selects the Parameters to Send tab 404C, the configuration utility obtains and displays only the parameters that were marked for bulk transfer in the Layout views and the Other Parameters views for the field device. Next, the user may change the bulk transfer status of a parameter by selecting the bulk transfer status icon 460, which will cause the configuration utility to toggle that status to not being marked for bulk transfer and to display the ⊘ bulk transfer icon in the MarkToSend column. Of course, the user may make changes to any of the parameter values in the parameter value edit fields 458 and may change the bulk transfer status of any of the parameters in this view. Upon making any changes, the configuration utility marks the edited parameter as edited and then displays the Save and Cancel buttons 420 and 422 on the device screen 450. After the user has modified any or all of the parameters, either the parameter values and/or the bulk transfer status icons, the user may select the Save button 420 and the configuration utility will save the data (edited parameter value data and the bulk transfer status data) to the configuration data for future bulk transfer download. The configuration utility will also then hide or remove the Save and Cancel buttons 420, 422 on the device screen 450. If desired, the device screen 40 may include an immediate download button that causes an immediate initiation of the bulk transfer operation of the parameters in the list 452. If the user selects such a button, the parameters that were in the list 452 will be downloaded in a bulk transfer operation and will be removed from the list of Parameters to Send. As also illustrated in FIGS. 9-12, the Parameters to Send tab 404C may include an indication of the current number of parameters for the field device that are marked to be included in a bulk transfer operation.

Of course, the displays of FIGS. 9-12 are only some examples of manners in which the configuration utility can provide configuration information and enable bulk transfer configuration activities while providing field device component contextual information to the user to assist the user in performing the configuration activities. As other example, the configuration system could combine the Parameter to Send view and the Layout view by providing the pages and groupings of the parameters and displaying the parameters in one column instead of 3-5 columns as generally dictated by the DD. The configuration utility could also provide a search functionality in such a combined view, or in the Other Parameters view and/or in the Parameters to Send view to enable the user to more easily locate a target parameter.

Still further, while the system described herein may perform or directly initiate bulk transfer operations, the data or views described herein could also or instead be exported to a file and be used in a larger device manager system, such as the AMS Device Manager Bulk Transfer Utility, or this configuration system or utility may be otherwise integrated into another device manager application, such as the AMS Device Manager Bulk Transfer Utility.

It will be noted that the configuration utility will need to obtain the field device parameter data from the data source (e.g., the configuration database) when presenting the various screens of, for example, FIGS. 9-12. As the configuration utility may be connected to the database via a relatively slow or low bandwidth connection, and/or the data to be retrieved can by large in volume, and/or the data within the database to be searched may be large, this data retrieval operation may take a bit of time. In order to provide a more comprehensible user interface, the configuration utility may, upon the user selecting a target field device, present the Layout view for the field device (as this view may typically involve less data retrieval from the database as this view is predefined by the configuration template). Moreover, filtering out parameters that are not part of the DD defined layout will result in some performance hit to the configuration utility retrieval process. This filtering process should thus be performed by the configuration utility within a server or database device (e.g., the server 36 or database 34 of FIG. 1) to increase data retrieval performance.

In any event, as noted above, when the configuration utility switches views from the Layout view to the Other Parameters view, there may be a significant waiting time for retrieval of the Other Parameters data from the configuration database. It may be important to manage the user's expected waiting time to complete the Other Parameters view to keep the user from becoming confused. There are a number of different ways in which the configuration utility may present the data in the Other Parameters view upon that view being selected to make the user aware of the data retrieval in process or to assure that the user knows that not all of the other parameters data is currently presented.

Figure 13:
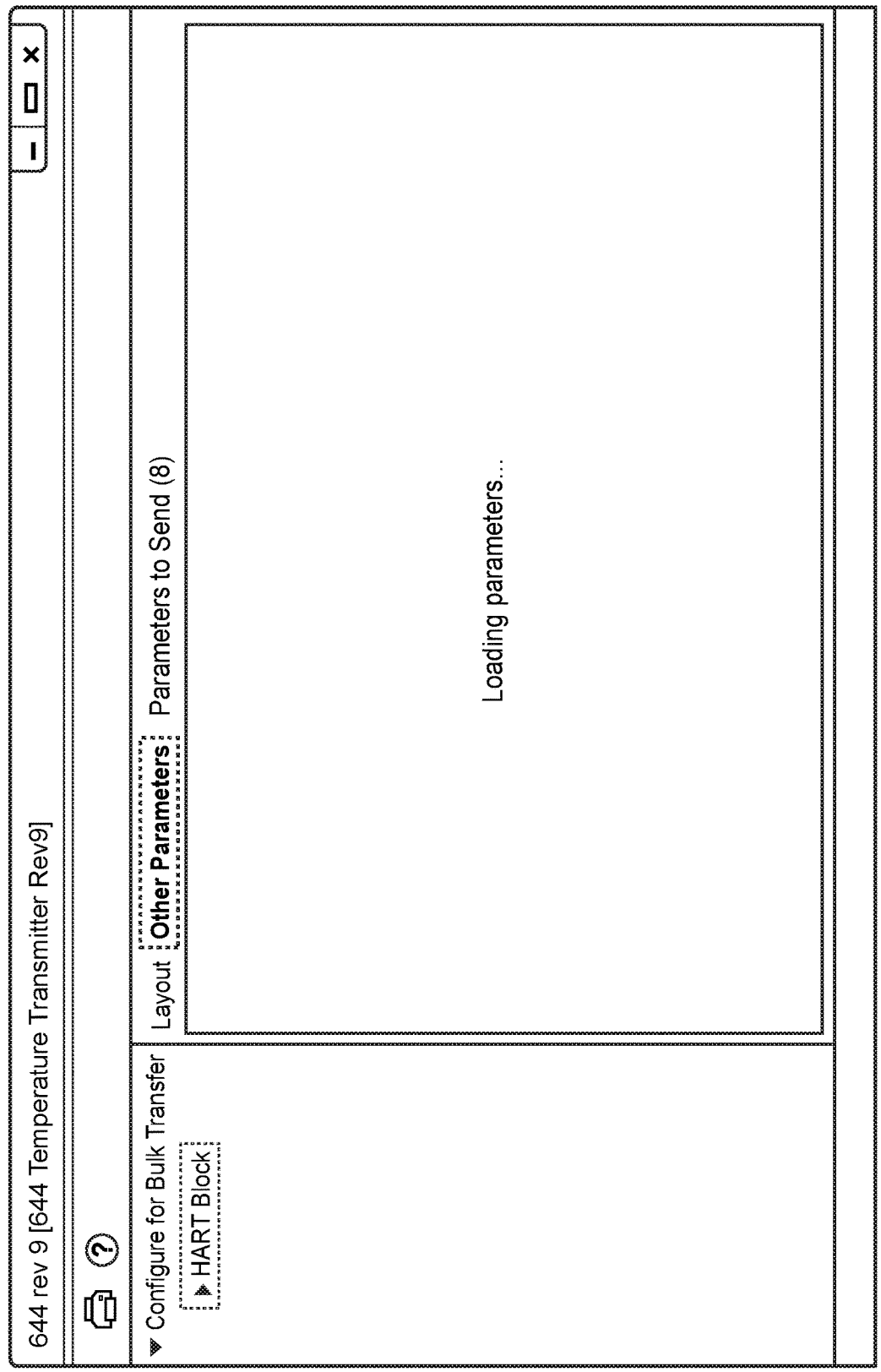
FIG. 13 is screenshot of a user interface provided by a configuration utility that may be used during a first type of field device parameter data retrieval during configuration activities.

In particular, the configuration utility may simply retrieve all of the Other Parameters data before illustrating any parameter in the Other Parameters view. While waiting for the retrieval of the Other Parameters data to complete, the user may click on the tabs 404 (e.g., the Layout tab 404A and Parameters to Send tab 404C) to view these screens and associated data. However, generally speaking, the configuration utility may present to the user a "loading parameters" message in the Other Parameters view until all of the data for all of the "other" parameters is fetched from the server. FIG. 13 illustrates an example screen 460 that the configuration utility may present to the user while the Other Parameters data is loading. Thereafter, the configuration utility will display the other parameters only after all "other" parameters are retrieved from the server.

In another case, the configuration utility may display the other parameters data as it is acquired and so may populate the list in the Other Parameters view as that data arrives. In this case, as illustrated in FIG. 14, the configuration utility may populate the list 472 as the data arrives but may display a "loading data message" in the device screen to notify the user that not all of the Other Parameters data is retrieved and displayed. In this case, however, the configuration utility may enable the user to edit/modify any of the displayed parameters in the list 472. Moreover, the configuration utility may provide or display a data retrieval status bar 474 to show that the device screen 470 is still retrieving more parameter data.

In yet another case, the configuration utility may initialize (i.e., retrieve) the other parameters data in the background while any of the other screens, e.g., the Layout view and the Parameters to Send view, is displayed. That is, the configuration utility may initialize the Layout view and data subscriptions associated with the data in the Layout view first, and while these views are displayed to the user, the configuration utility may load the Other Parameters data as a background process. In this case, if the user clicks on the Other Parameters tab 404B, he or she may or may not find any parameters. Here, the initialization of the Other Parameters view will only start after the Layout view has been initialized and its subscriptions to data in the database have been established.

In yet another case, the configuration utility may only make the Other Parameters tab 404B selectable after all of the other parameters data has been retrieved from the server or configuration database. As a result, the other parameters tab 404B is not clickable until the data is ready to be shown. Generally, in this case, the configuration utility will initialize the Layout view first, and will set up the data subscriptions for that view. Then, the configuration utility will search for and download the other parameters data regardless of when the user selects the Other Parameters view tab 404B. However, the configuration utility will not initialize the Other Parameters tab 404B as being clickable until all of the data for that view has been retrieved.

Still further, the configuration utility may provide information about bit enumerated parameters in a manner that is easy to view, change, and understand. In particular, when the configuration utility discovers a bit enumerated parameter from the database and displays this data as parameter data in one of the views, such as the Other Parameters view, the configuration utility may display the bit enumerated parameter as a single parameter with a single bulk transfer status indication or icon and a single general name field, but will provide a separate description or sub-name field and an editable value field for each bit. As an example, FIG. 15 depicts a device screen 480 displayed under the other parameters tab 404B that includes a list of parameters, wherein each parameter in the list includes a device parameter name 482, a value edit field 484, and a bulk transfer status indication 486. In this example, the parameters in the list of parameters includes two bit enumerated parameters called Device Status Mask and Ext Dev Status Mask. Here, in the edit fields 484 of these parameters, the configuration utility displays a sub-name for each bit related to the function of that bit and a bit set icon or field to enable the user to set or not set the bit. However, there is only a single bulk transfer status icon or indication for each such bit. As such, if the user changes any of the bits of a bit enumerated parameter, the configuration utility changes the bulk transfer status icon 486 to be set for bulk transfer. This display and configuration functionality provides additional contextual information to the user to enable the user to better find, edit, and configure device parameters.

FIG. 17 is a diagrammatic view of a computing environment on which one or more applications of the asset management system may execute. Additionally, it is expressly contemplated that the asset management system may comprise multiple computing devices working cooperatively or individually to execute one or more individual software applications in an asset management suite. With reference to FIG. 17, an exemplary system for implementing some embodiments includes a general-purpose computing device in the form of a computer 810. Components of the computer 810 may include, but are not limited to, a processing unit 820 (which can comprise a processor), a system memory 830, and a system bus 821 that couples various system components including the system memory to the processing unit 820. The system bus 821 may be any of several types of bus structures including a memory bus or memory controller, a peripheral bus, and a local bus using a variety of but architectures. Memory and programs described with respect to FIGS. 1 and 2 can be employed in corresponding portions of FIG. 17.

The computer 810 typically includes a variety of computer readable media, which can be any available readable media that can be accessed by computer 810 and includes both volatile and nonvolatile media, and removable and non-removable media. By way of example, and not limitation, computer readable media may comprise computer storage media and communication media. Computer storage media is different from, and does not include, a modulated data signal or carrier wave, but includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the computer 810. Communication media may embody computer readable instructions, data structures, program modules or other data in a transport mechanism and includes any information delivery media. The term "modulated data signal" means a signal that has one or more of its characteristics set or changed in a manner so as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in the ROM 831. The RAM 832 typically contains data and/or program modules that are immediately accessible to and/or presently being operated on by the processing unit 820. By way of example, and not limitation, FIG. 17 illustrates an operating system 834, application programs 835, other program modules 836, and program data 837.

The computer 810 may also include other removable/non-removable volatile/nonvolatile computer storage media. By way of example only, FIG. 17 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as an interface 840, and a magnetic disk drive 851 and an optical disk drive 855 are typically connected to the system bus 821 by a removable memory interface, such as an interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-Specific Standard Products (PSSPs), System-On-a-Chip systems (SOCs), Complex Programmable Logic Devices (CPLDs), etc.

The drives and their associated computer storage media discussed above and illustrated in FIG. 17 provide storage of computer readable instructions, data structures, program modules and other data for the computer 810. In FIG. 17, for example, the hard disk drive 841 is illustrated as storing operating system 844, the application programs 845, other program modules 846, and the program data 847. Note that these components can either be the same as or different from the operating system 834, the application programs 835, the other program modules 836, and the program data 837. The operating system 844, the application programs 845, the other program modules 846, and the program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a voice recognition circuit, a joystick, a game pad, a scanner, or the like. These and other input devices are often connected to the processing unit 820 through a user input interface 860 that is coupled to the system bus 821, but may be connected by other interface and bus structures, such as a parallel port, a game port or a universal serial bus (USB). A visual display 891 or other type of display device is also connected to the system bus 821 via an interface, such as a video interface 890. In addition to the monitor, computers may also include other peripheral output devices such as speakers 897 and a printer 896, which may be connected through an output peripheral interface 895.

The computer 810 may be operated in a networked environment using logical connections, such as a local area network (LAN) or a wide area network (WAN), to one or more remote computers, such as a remote computer 880. When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 17 illustrates, for example, that remote application programs 885 can reside on a remote computer 880.

Although the present invention has been described with reference to preferred embodiments, workers skilled in the art will recognize that changes may be made in form and detail without departing from the spirit and scope of the invention. For example, while the embodiments described above generally employ an online connection with an intelligent field device, embodiments can be practiced where the configuration(s) is loaded into a handheld configurator that would update an individual intelligent field device if the device identifier matches a device tag associated with a configuration stored in the handheld device.

The invention claimed is:

1. A configuration system for use in configuring field devices in a process plant, comprising:
   a database that stores configuration information for a plurality of field devices in the plant, the configuration information including, for each of the plurality of field devices, a set of configurable field device parameters for each of the plurality of field devices and an indication of a set of field device components for each field device;
   a configuration application that executes on a processor to access the database to obtain configuration information pertaining to a selected one of the plurality of field devices, the configuration information including, for a field device, a plurality of field device components associated with the field device and a set of field device parameters associated with the field device and to provide, to a user via a display device, for each field device parameter, a field device parameter name and an editable field device parameter value field and a bulk transfer status indication,
   wherein the configuration application enables the user to select one of the field device components via the user interface and creates a display that displays information identifying a plurality of field device parameters related to the selected one of the field device components to which the field device parameters are associated and enables the user to alter the field device parameter value in the field device parameter value field and to view the bulk transfer status indication of the edited field device parameter at the same time, and
   wherein the configuration application displays a selectable set of views to be used to display field device parameters for the field device, wherein the selectable set of views to be used to display field device parameters includes a first view that displays field device parameters as defined by a device description for the field device and a second view that displays all other field device parameters not included in the first view, and wherein the configuration application enables the user to switch between the views; and
   a bulk transfer application that executes on a processor to download the parameter values within the parameter value fields of each of the field device parameters having a bulk transfer status indication set for participation in the bulk transfer to the field device.

2. The configuration system of claim 1, wherein the configuration application automatically sets the bulk transfer status indication of a particular field device parameter to indicate that the particular field device parameter is set for a bulk transfer operation when the user changes the field device parameter value in the field device parameter value field of the particular field device parameter.

3. The configuration system of claim 1, wherein the configuration application enables the user to interact with the field device bulk transfer status indication for a particular field device parameter to change the bulk transfer status of the particular field device parameter.

4. The configuration system of claim 1, wherein the configuration application displays a first screen that includes indications of multiple ones of the field device components and enables a user to select one of the indications of the field device components and, in response to the selection of one of the indications of the field device components, displays a plurality of field device parameters related to the selected field device component.

5. The configuration system of claim 4, wherein the configuration application, in response to the selection of the one of the indications of the field device components, displays a set of field device parameters related to the selected field device component without displaying any field device parameters not related to the selected field device component.

6. The configuration system of claim 1, wherein the configuration application displays indications of multiple ones of the field device components and presents a different set of field device parameters to the user via the display in response to a selection of each of the different ones of the field device components.

7. The configuration system of claim 1, wherein the configuration application displays a first set of screens, with each screen including field device parameters associated with different ones of the field device components, and a second screen that includes parameters not associated with any of the field device components.

8. The configuration system of claim 7, wherein the configuration application displays in the first set of screens, field device parameters associated with different ones of the field device components as defined by a device description for the field device.

9. The configuration system of claim 1, wherein the configuration application displays a first set of screens, with each screen in the first set of screens including field device parameters related to different ones of the field device components, and a second screen that includes all other field device parameters for the field device not displayed in any of the first set of screens.

10. The configuration system of claim 1, wherein the selectable set of views to be used to display field device parameters includes a third view that indicates all of the field device parameters that are currently set to participate in a bulk transfer operation.

11. The configuration system of claim 1, wherein the field device components include physical components.

12. The configuration system of claim 11, wherein the physical field device components include sensors.

13. The configuration system of claim 1, wherein the field device components include logical components.

14. The configuration system of claim 13, wherein the logical field device components include one or more of display components, diagnostic components, function block components, and output components.

15. The configuration system of claim 1, wherein the field device components include both physical and logical components.

16. A method of configuring field devices in a process plant, comprising:
   storing configuration information for a plurality of field devices of the process plant in a database, the configuration information including, for each of the plurality of field devices, a set of configurable field device parameters for each of the plurality of field devices and an indication of a set of field device components for each field device;

enabling a user, via a user interface, to select one the plurality of field devices for configuration;

obtaining configuration information from the database pertaining to a selected one of the plurality of field devices, providing to a user, via a user interface, the configuration information including, for a field device, a plurality of field device components associated with the field device and a set of field device parameters associated with the field device including, for each field device parameter, a field device parameter name, an editable field device parameter value field, and a bulk transfer status indication associated with the field device parameter;

displaying, via the user interface, a selectable set of views to be used to display field device parameters for the field device and enabling the user to switch between the views via the user interface, wherein the selectable set of views to be used to display field device parameters includes a first view that displays field device parameters as defined by a device description for the field device and a second view that displays all other field device parameters not included in the first view;

enabling the user, via the user interface, to select one of the field device components;

creating a display in response to the selection of one of the field device components that displays information identifying a plurality of field device parameters related to the selected one of the field device components to which the field device parameters are associated;

enabling the user, via the user interface, to alter the field device parameter value in a field device parameter value field and to view the bulk transfer status indication of the edited field device parameter at the same time; and downloading the parameter values within the parameter value fields of each of the field device parameters having a bulk transfer status indication set for participation in the bulk transfer to the field device.

17. The method of claim 16, further including automatically setting the bulk transfer status indication of a particular field device parameter to indicate that the particular field device parameter is set for a bulk transfer operation when the user changes the field device parameter value in the field device parameter value field of the particular field device parameter.

18. The method of claim 17, further including enabling the user to interact with the field device bulk transfer status indication for a particular field device parameter via the user interface to change the bulk transfer status of the particular field device parameter.

19. The method of claim 16, further including displaying a first screen via the user interface that includes indications of multiple ones of the field device components and enabling a user to select one of the indications of the field device components via the user interface and, in response to the selection of one of the indications of the field device components, displaying a plurality of field device parameters related to the selected field device component.

20. The method of claim 16, further including displaying indications of multiple ones of the field device components via the user interface and presenting a different set of field device parameters to the user via the user interface in response to a selection of each of the different ones of the field device components.

21. The method of claim 16, wherein the selectable set of views includes a third view that indicates all of the field device parameters that are currently set to participate in a bulk transfer operation.

22. The method of claim 16, further including displaying a first set of screens via the user interface, with each screen in the first set of screens including field device parameters associated with different ones of the field device components, and displaying a second screen that includes parameters of the field device not associated with any of the field device components.

23. The method of claim 22, further including displaying a third screen that indicates all of the field device parameters for a field device that are currently set to participate in a bulk transfer operation.

24. A configuration system for use in configuring field devices in a process plant having a database that stores configuration information for a plurality of field devices in the plant, the configuration system comprising:

a configuration application that executes on a processor to;

access the database to obtain configuration information pertaining to the field devices, the configuration information including, for each field device, a plurality of field device parameters associated with the field device and contextual information about one or more of the plurality of field device parameters as used in the field device, enable a user to select one of the field devices via the user interface, display field device information about the selected field device to the user via a user interface, the field device information including a plurality of field device parameters related to the selected field device, contextual information about one or more of the field device parameters and a bulk transfer status indication indicating whether changes to a field device parameter are set for participation in a bulk transfer operation to the field device, wherein the contextual information about the one or more field device parameters includes an indication of a field device component to which a field device parameter relates, and enable the user to alter a field device parameter value in a field device parameter value field on the user interface and to view the bulk transfer status indication of the edited field device parameter on the user interface at the same time; and a bulk transfer application that executes on a processor to download the parameter values within the parameter value fields of each of the field device parameters having a bulk transfer status indication set for participation in the bulk transfer to the field device.

25. The configuration system of claim 24, wherein the configuration application automatically sets the bulk transfer status indication of a particular field device parameter to indicate that the particular field device parameter is set for a bulk transfer operation when a user alters the field device parameter value in the field device parameter value field of the particular field device parameter.

26. The configuration system of claim 24, wherein the configuration application enables the user to interact with the field device bulk transfer status indication for a particular field device parameter to change the bulk transfer status of the particular field device parameter.

27. The configuration system of claim 24, wherein the configuration application displays a first screen that includes indications of multiple ones of a set of field device components associated with the selected field device and enables a user to select one of the indications of the field device components and, in response to the selection of one of the indications of the field device components, displays a plurality of field device parameters related to the selected field device component.

28. The configuration system of claim 27, wherein the configuration application, in response to the selection of the one of the indications of the field device components, displays a set of field device parameters related to the selected field device component without displaying any field device parameters not related to the selected field device component.

29. The configuration system of claim 24, wherein the configuration application displays indications of multiple ones of a set of field device components associated with the selected field device and presents a different set of field device parameters to the user via the display in response to a selection of each of the different ones of the field device components.

30. The configuration system of claim 29, wherein the configuration application further presents contextual information about how each of the different set of field device parameters associated with a selected field device component relates to the selected field device component to the user via the user interface in response to a selection of each of the different ones of the field device components.

31. The configuration system of claim 24, wherein the configuration application displays a first set of screens in response to a selection of a field device, with each first screen including field device parameters associated with a different one of a set of field device components, and a second screen that includes parameters not associated with any of the field device components.

32. The configuration system of claim 31, wherein the configuration application displays in the first set of screens, field device parameters associated with different ones of the field device components as defined by a device description for the field device.

33. The configuration system of claim 31, wherein the configuration application displays a third screen that indicates all of the field device parameters that are currently set to participate in a bulk transfer operation.

34. The configuration system of claim 31, wherein the configuration application enables a user to switch between the views of the first set of screens and the second screen and the third screen.

35. The configuration system of claim 31, wherein the field device components include physical components.

36. The configuration system of claim 31, wherein the field device components include logical components.

* * * * *